United States Patent
Kadobayashi et al.

(10) Patent No.: US 12,401,699 B2
(45) Date of Patent: Aug. 26, 2025

(54) INFORMATION PROCESSING DEVICE AND INFORMATION PROCESSING METHOD FOR MANAGING A VIDEO CALL

(71) Applicant: SONY GROUP CORPORATION, Tokyo (JP)

(72) Inventors: Masako Kadobayashi, Tokyo (JP); Masatoshi Fukuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/004,232

(22) PCT Filed: Jun. 2, 2021

(86) PCT No.: PCT/JP2021/021029
§ 371 (c)(1),
(2) Date: Jan. 4, 2023

(87) PCT Pub. No.: WO2022/014184
PCT Pub. Date: Jan. 20, 2022

(65) Prior Publication Data
US 2023/0262100 A1    Aug. 17, 2023

(30) Foreign Application Priority Data
Jul. 14, 2020 (JP) .................... 2020-120489

(51) Int. Cl.
*H04H 20/38* (2008.01)
*H04H 60/61* (2008.01)
*H04L 65/1093* (2022.01)
*H04L 65/403* (2022.01)

(52) U.S. Cl.
CPC ........ *H04L 65/1093* (2013.01); *H04L 65/403* (2013.01)

(58) Field of Classification Search
CPC ..... H04L 65/1093; H04L 65/403; H04N 7/15; H04M 3/42; H04M 3/56
USPC ......................................... 709/204
See application file for complete search history.

(56) References Cited

U.S. PATENT DOCUMENTS

| | | | |
|---|---|---|---|
| 9,001,118 B2 * | 4/2015 | Molyneaux .......... | G06V 20/653 345/419 |
| 9,992,330 B1 * | 6/2018 | Hodge .................... | H04M 3/38 |
| 10,719,919 B1 * | 7/2020 | Kosugi .................... | G06T 5/70 |
| 2008/0068447 A1 * | 3/2008 | Mattila .................... | H04N 7/15 348/E7.083 |
| 2008/0284841 A1 * | 11/2008 | Modai .................... | H04N 7/152 348/14.1 |
| 2014/0267546 A1 * | 9/2014 | Kwon .................... | H04N 7/147 348/14.02 |
| 2014/0362163 A1 * | 12/2014 | Winterstein ............. | H04N 7/15 348/14.07 |

(Continued)

FOREIGN PATENT DOCUMENTS

KR    2010061264 A    *    6/2010

*Primary Examiner* — Christopher B Robinson
(74) *Attorney, Agent, or Firm* — CHIP LAW GROUP

(57) ABSTRACT

An information processing device including a call control unit that controls a video call between a performer terminal used by a performer and a participant terminal used by a participant, in which the call control unit forcibly terminates the video call on the basis of a stop request received from the performer terminal or an observer terminal used by an observer who monitors the video call.

19 Claims, 16 Drawing Sheets

(56) References Cited

U.S. PATENT DOCUMENTS

| | | | | |
|---|---|---|---|---|
| 2017/0302795 A1* | 10/2017 | Wolzien | ............. | H04L 65/4015 |
| 2017/0337912 A1* | 11/2017 | Caligor | ............. | H04N 21/4341 |
| 2019/0244407 A1* | 8/2019 | Wiesel | ................ | G06V 10/255 |
| 2020/0211201 A1* | 7/2020 | Chiang | ................ | G06T 11/001 |
| 2020/0296327 A1* | 9/2020 | Karafin | ................ | G03H 1/2294 |
| 2020/0342963 A1* | 10/2020 | Mohammad | ........... | G16H 80/00 |

* cited by examiner

INFORMATION PROCESSING DEVICE AND INFORMATION PROCESSING METHOD FOR MANAGING A VIDEO CALL

TECHNICAL FIELD

The present disclosure relates to an information processing device, an information processing method, a program, and a system.

BACKGROUND ART

In recent years, a mechanism for sharing information including a video among a plurality of users has been developed. For example, Patent Document 1 discloses a system that shares a video between a player who operates content and an audience who browses the content.

CITATION LIST

Patent Document

Patent Document 1: Japanese Patent Application Laid-Open No. 2012-107402

SUMMARY OF THE INVENTION

Problems to be Solved by the Invention

Here, a case is assumed where video sharing is performed by a large number of people as described above between performers and an unspecified large number of participants. In such a case, a mechanism for protecting performers from various situations that may occur is important.

Solutions to Problems

According to one aspect of the present disclosure, there is provided an information processing device including a call control unit that controls a video call between a performer terminal used by a performer and a participant terminal used by a participant, in which the call control unit forcibly terminates the video call on the basis of a stop request received from the performer terminal or an observer terminal used by an observer who monitors the video call.

Furthermore, according to another aspect of the present disclosure, there is provided an information processing method including controlling, by a processor, a video call between a performer terminal used by a performer and a participant terminal used by a participant, in which the controlling further includes forcibly terminating the video call on the basis of a stop request received from the performer terminal or an observer terminal used by an observer who monitors the video call.

Furthermore, according to another aspect of the present disclosure, there is provided a program for causing a computer to function as an information processing device including a call control unit that controls a video call between a performer terminal used by a performer and a participant terminal used by a participant, in which the call control unit forcibly terminates the video call on the basis of a stop request received from the performer terminal or an observer terminal used by an observer who monitors the video call.

Furthermore, according to another aspect of the present disclosure, there is provided a system including: a performer terminal used by a performer; a participant terminal used by a participant; a server that controls a video call between the performer terminal and the participant terminal; and an observer terminal used by an observer who monitors the video call, in which the server forcibly terminates the video call on the basis of a stop request received from the performer terminal or the observer terminal.

MODE FOR CARRYING OUT THE INVENTION

Figure 1:
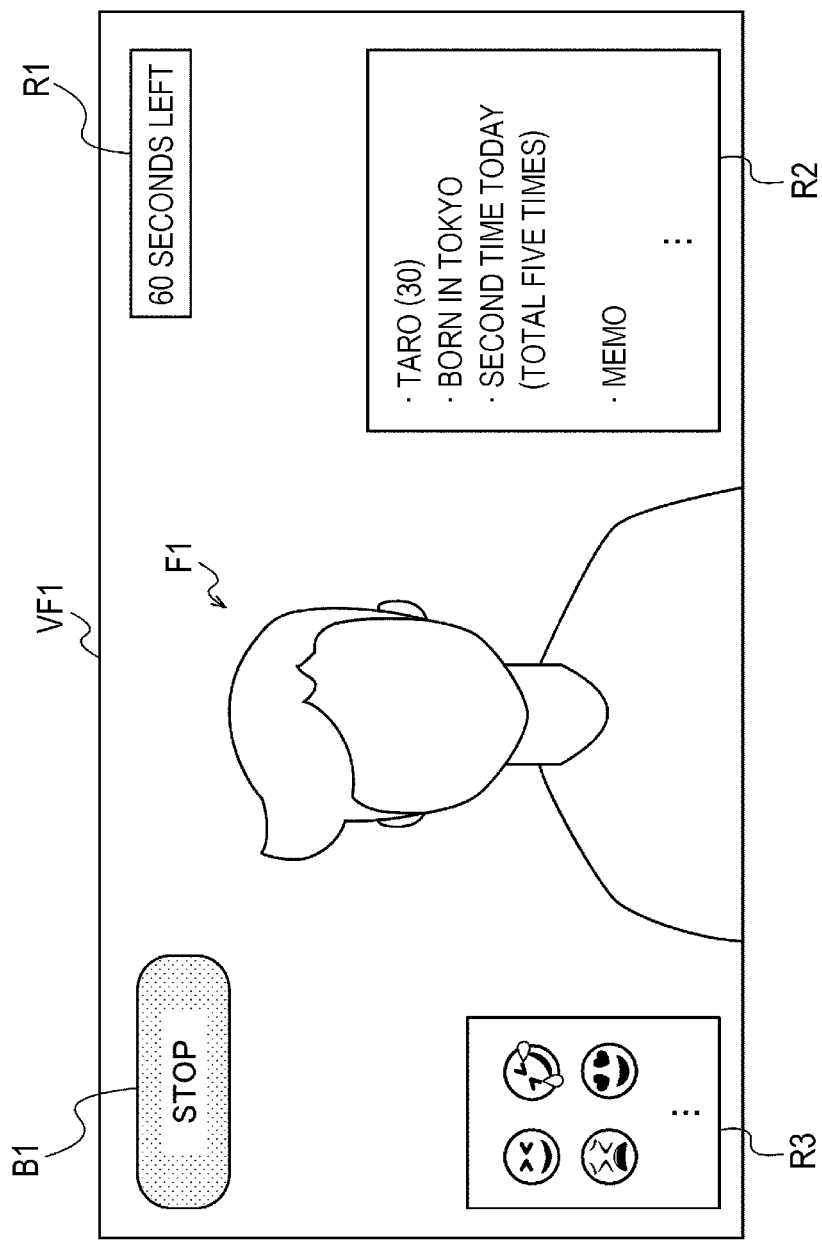
FIG. 1 is a diagram for describing an outline of call control according to an embodiment of the present disclosure.

Hereinafter, a preferred embodiment of the present disclosure will be described in detail with reference to the accompanying drawings. Note that, in the present specification and the drawings, components having substantially the same functional configuration are denoted by the same reference numerals, and redundant description is omitted.

Note that the description will be given in the following order.
1. Embodiment
  1.1. Background
  1.2. System Configuration Example
  1.3. Configuration Examples of Various Terminals
  1.4. Functional Configuration Example of Server 40

1.5. Details of Control
1.6. Flow of Processing
2. Hardware Configuration Example
3. Summary 1. Embodiment <<1.1. Background>>

Conventionally, many events have been held in which celebrities and ordinary people interact with each other. In an event as described above, ordinary people can come in close contact with supporting celebrities, and the celebrities can know the inside of the mind of fans that the celebrities usually rarely come in contact with or the like.

Furthermore, in recent years, interaction events between artists engaged in music activities and fans have been particularly actively held. In such an interaction event, fans can actually have a conversation with artists, shake hands with the artists, and the like, and the interaction event is widely supported to further strengthen the connection between the artists and the fans.

Meanwhile, such an interaction event as described above has a large restriction from the viewpoint of securing a venue, securing a schedule of an artist, and the like, and there are cases where it is difficult to hold the event frequently and where the burden required for holding the event increases.

Furthermore, from the viewpoint of public health, it may not be desired to densely gather a large number of people. In such a case, there may be a case where it is necessary to give up holding an interaction event in order to protect the health of fans and artists.

However, canceling or postponing the interaction event due to various circumstances may discourage fans and artists who are looking forward to the interaction event.

In order to avoid the above situation, for example, it is also assumed that an interaction event that has been held offline so far is held online.

By holding the interaction event online, there are fewer restrictions on the venue and schedule, and for example, the interaction event can be held more easily using the spare time of the artists.

Furthermore, by holding an interaction event online, the public health concerns as described above can be solved, and fans and artists can enjoy the event with a sense of security in a safe environment.

Meanwhile, in a conventional offline interaction event, various safety measures have been taken, such as arranging personnel or the like to protect the artists from some fans who make excessive appeal to the artists and participants for the purpose of jeering.

Even in a case where the place of the interaction event is moved online, safety measures are similarly important, and a mechanism for protecting artists online is required.

The technical idea according to the present disclosure has been conceived by focusing on the above points, and provides a mechanism for effectively protecting performers in an online interaction event.

For this purpose, a server 40 according to an embodiment of the present disclosure includes a call control unit 410 that controls a video call between a performer terminal 20 used by a performer and a participant terminal 10 used by a participant. Furthermore, one of the features of the call control unit 410 according to an embodiment of the present disclosure is that the video call described above is forcibly terminated on the basis of a stop request received from the performer terminal 20 or an observer terminal 30 used by the observer who monitors the video call described above.

Here, the performers according to an embodiment of the present disclosure widely include various performers who interact with an unspecified large number of participants in an online interaction event. Examples of the performers include those who perform various arts, those who perform performances, and the like.

In the following, artists engaged in music activities are assumed as an example of the performers. Furthermore, in the following description, a participant participating in a video call with an artist in an interaction event may be referred to as a fan.

FIG. 1 is a diagram for describing an outline of call control according to an embodiment of the present disclosure. FIG. 1 illustrates an example of a fan video VF1 displayed on the performer terminal 20 and the observer terminal 30. Here, the fan video VF1 may be an image obtained by capturing a fan F1 using the terminal by the participant terminal 10.

The artist who operates the performer terminal 20 can enjoy the interaction with the fan F1 while viewing the fan video VF.

Furthermore, in addition to the fan video VF1, the call control unit 410 of the server 40 according to the present embodiment may cause the performer terminal 20 or the like to display information for the artist to more actively interact with the fan F1.

In the case of the example illustrated in FIG. 1, the call control unit 410 displays the remaining time of the video call in the area R1. According to such display control, the artist can clearly grasp the remaining time of the video call, and can notify the fan F1 of gratitude for participation, expectation for next participation, and the like.

Furthermore, in the case of the example illustrated in FIG. 1, the call control unit 410 displays information regarding the fan F1 in the area R2. The information includes, for example, the name of the fan F1 (or the nickname set by the fan F1), the hometown or residential area of the fan F1, the number of video calls in the current interaction event, the total number of video calls in the interaction events so far, other memos, and the like.

When the call control unit 410 causes the performer terminal 20 to display the information as described above, the artist can provide a topic corresponding to the information to the fan F1, and an effect of further activating interaction between the two is expected.

Furthermore, in the case of the example illustrated in FIG. 1, the call control unit 410 displays an icon that can be used to express an artist's feeling in the area R3. In this case, the artist may transmit the icon to the participant terminal 10 used by the fan F1 by selecting the icon displayed in R3 by a tap operation or the like.

According to the control as described above, an online unique interaction tool different from an offline interaction event can be provided, and further activating interaction is expected.

As illustrated above, the call control unit 410 included in the server 40 according to the present embodiment performs various types of control for activating the interaction between the artist and the fan F1.

Meanwhile, the call control unit 410 according to the present embodiment may similarly provide a mechanism for protecting an artist.

As an example of the mechanism described above, for example, the call control unit 410 according to the present embodiment may cause the performer terminal 20 and the observer terminal 30 to display a visual object for transmitting a stop request for requesting stop of the video call in association with the start of the video call.

Examples of the visual object described above include various buttons and icons, for example.

In the case of the example illustrated in FIG. 1, the call control unit 410 displays a button B1 for transmitting a stop request on the performer terminal 20 and the observer terminal 30.

In this case, the call control unit 410 according to the present embodiment may receive a stop request transmitted by operating the button B1 in the performer terminal 20 or the observer terminal 30, and immediately forcibly terminate the video call being executed on the basis of the stop request.

According to the control as described above, in a case where the fan F1 behaves inappropriately (or shows signs of behaving inappropriately), the video call can be forcibly terminated according to the determination of the artist or the observer, and the damage that the artist may suffer can be effectively reduced.

Note that examples of the inappropriate behavior described above include defamation, excessive appeal, or the like to the artist A1.

The outline of the video call control according to the present embodiment has been described above. Note that the content described with reference to FIG. 1 is merely an example, and the entire video call control according to the present embodiment is not limited to such an example.

Hereinafter, a configuration example for implementing video call control in the present embodiment will be described in detail.

<<1.2. System Configuration Example>>

Figure 2:
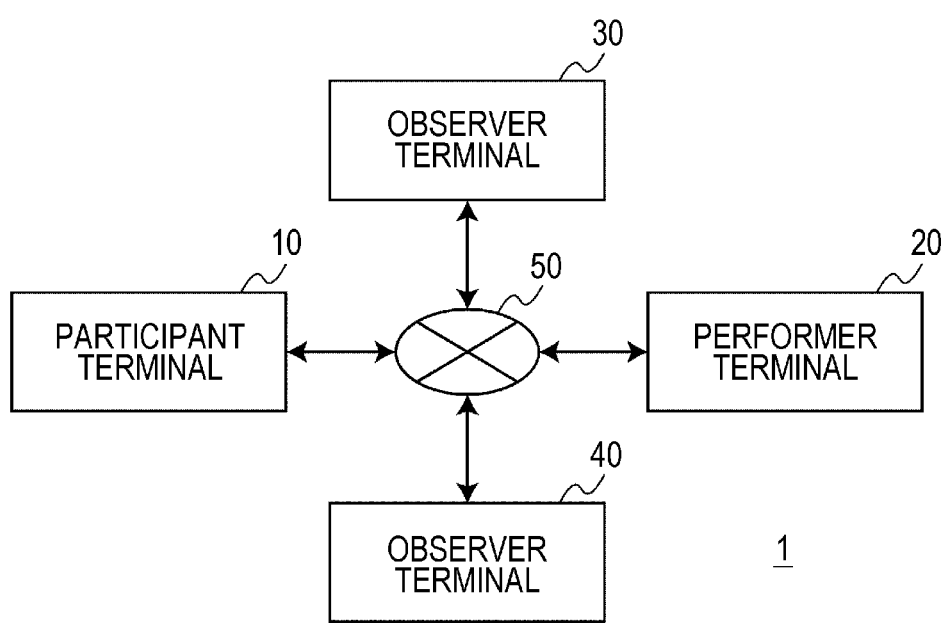
FIG. 2 is a block diagram illustrating a configuration example of a system 1 according to the embodiment.

First, a configuration example of a system 1 according to the present embodiment will be described. FIG. 2 is a block diagram illustrating a configuration example of the system 1 according to the present embodiment. As illustrated in FIG. 1, the system 1 according to the present embodiment includes the participant terminal 10, the performer terminal 20, the observer terminal 30, and the server 40.

Furthermore, each of the configurations described above is connected by a network 50. An example of the network 50 is a public network such as the Internet or the like.

(Participant Terminal 10)

The participant terminal 10 according to the present embodiment is an information processing device used by a participant who makes a video call with a performer in an online interaction event.

Examples of the participant terminal 10 according to the present embodiment include a smartphone, a tablet, a PC, wearable devices such as a head mounted display or the like, and the like.

(Performer Terminal 20)

The performer terminal 20 according to the present embodiment is an information processing device used by a performer who makes a video call with an unspecified large number of participants in an online interaction event.

Examples of the performer terminal 20 according to the present embodiment include a smartphone, a tablet, a PC, and the like.

(Observer Terminal 30)

The observer terminal 30 according to the present embodiment is an information processing device used by an observer who monitors a video call made between a performer and a participant in an online interaction event. Note that examples of the observer include a staff member or the like of an organization to which the performer belongs or an organization that holds an interaction event.

Furthermore, examples of the observer terminal 30 according to the present embodiment include a smartphone, a tablet, a PC, and the like.

(Server 40)

The server 40 according to the present embodiment is an information processing device that controls a video call between the performer terminal 20 and the participant terminal 10.

The configuration example of the system 1 according to the present embodiment has been described above. Note that the configuration described above described with reference to FIG. 2 is merely an example, and the configuration of the system 1 according to the present embodiment is not limited to such an example. The configuration of the system 1 according to the present embodiment can be flexibly modified according to specifications and operations.

<<1.3. Configuration Examples of Various Terminals>>

Next, a functional configuration example related to various terminals such as the participant terminal 10, the performer terminal 20, the observer terminal 30, and the like according to the present embodiment will be described. Here, a functional configuration of the terminal 60 having a functional configuration equivalent to the various terminals described above will be exemplified.

Figure 3:
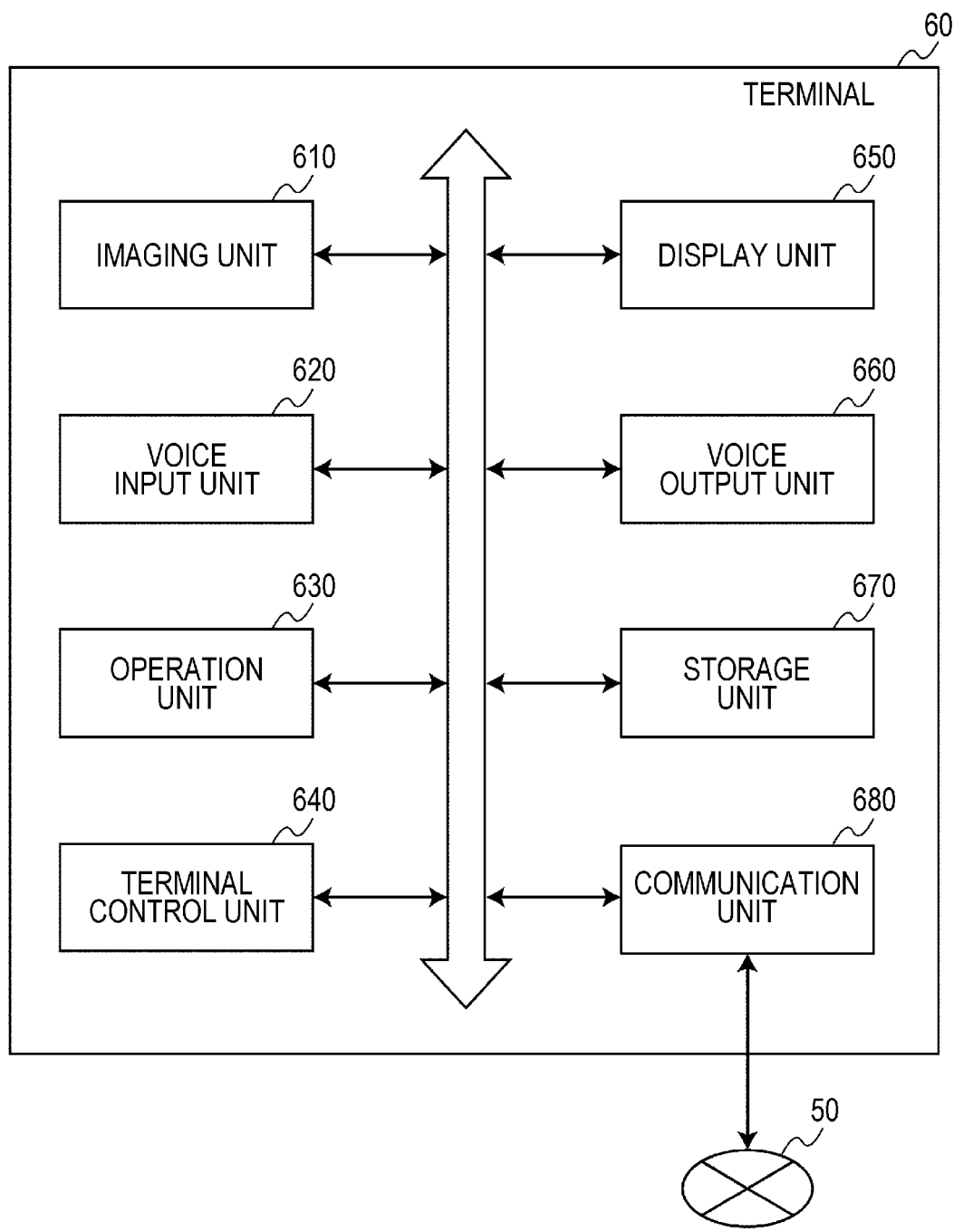
FIG. 3 is a block diagram illustrating a functional configuration example of a terminal 60 having a functional configuration equivalent to various terminals according to the embodiment.

FIG. 3 is a block diagram illustrating a functional configuration example of a terminal 60 having a functional configuration equivalent to various terminals according to the present embodiment. As illustrated in FIG. 3, the terminal 60 may include an imaging unit 610, a voice input unit 620, an operation unit 630, a terminal control unit 640, a display unit 650, a voice output unit 660, a storage unit 670, and a communication unit 680.

(Imaging Unit 610)

The imaging unit 610 images a video of a person who operates the terminal 60 as a subject. For this purpose, the imaging unit 610 includes various imaging elements.

(Voice Input Unit 620)

The voice input unit 620 collects various sounds including a voice of a person who operates the terminal 60. For this purpose, the voice input unit 620 includes a microphone.

(Operation Unit 630)

The operation unit 630 receives various operations by a person who operates the terminal 60. For this purpose, the operation unit 630 includes various buttons, switches, touch panels, and the like.

(Terminal Control Unit 640)

The terminal control unit 640 controls each configuration included in the terminal 60. The terminal control unit 640 may perform various types of control on the basis of, for example, a control signal received from the server 40. The functions of the terminal control unit 640 are implemented by various processors.

(Display Unit 650)

The display unit 650 displays various kinds of visual information. For example, the display unit 650 displays a video related to a video call. For this purpose, the display unit 650 includes various types of display.

(Voice Output Unit 660)

For example, the voice output unit 660 outputs sounds related to a video call. For this purpose, the voice output unit 660 includes a speaker and an amplifier.

(Storage Unit 670)

The storage unit 670 stores various types of information used by the terminal 60. For example, the storage unit 670 stores a program used by the terminal control unit 640.

(Communication Unit 680)

The communication unit 680 performs information communication with the server 40 via the network 50.

The functional configuration of the terminal 60 having the same functional configuration as various terminals such as the participant terminal 10, the performer terminal 20, the observer terminal 30, and the like according to the present embodiment has been exemplified above. Note that the functional configuration described above with reference to FIG. 3 is merely an example, and the functional configuration of the participant terminal 10, the performer terminal 20, and the observer terminal 30 according to the present embodiment is not limited to such an example. The functional configurations of the participant terminal 10, the performer terminal 20, and the observer terminal 30 according to the present embodiment can be flexibly modified according to specifications and operations.

<<1.4. Functional Configuration Example of Server 40>>

Figure 4:
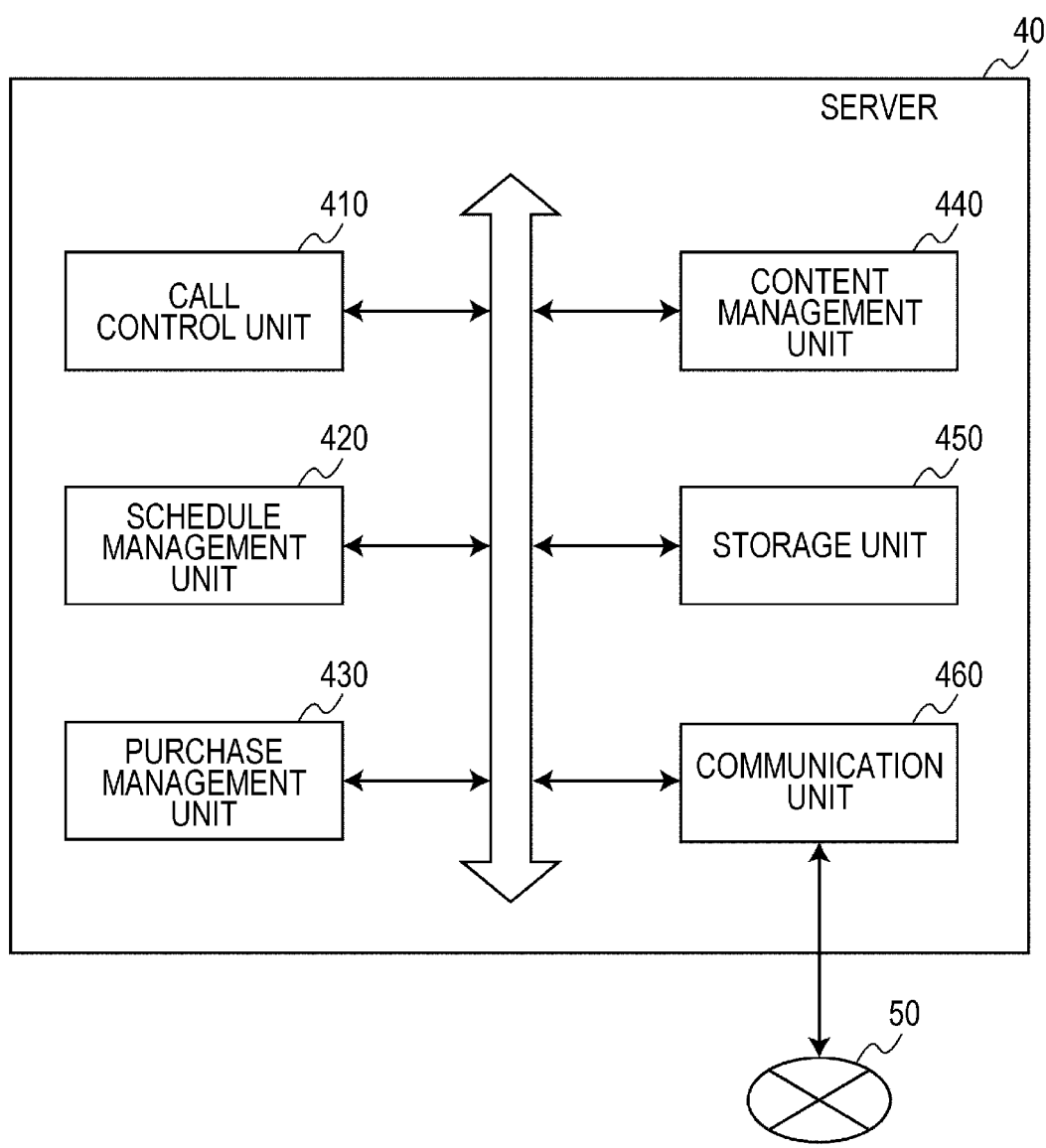
FIG. 4 is a block diagram illustrating a functional configuration example of a server 40 according to the embodiment.

Next, a functional configuration example of the server 40 according to the present embodiment will be described. FIG. 4 is a block diagram illustrating a functional configuration example of the server 40 according to the present embodiment. As illustrated in FIG. 4, the server 40 according to the present embodiment may include a call control unit 410, a schedule management unit 420, a purchase management unit 430, a content management unit 440, a storage unit 450, and a communication unit 460.

(Call Control Unit 410)

The call control unit 410 according to the present embodiment controls a video call between the performer terminal 20 and the participant terminal 10. Furthermore, one of the features of the call control unit 410 according to the present embodiment is to forcibly terminate the video call described above on the basis of a stop request received from the performer terminal 20 or the observer terminal 30.

The functions of the call control unit 410 according to the present embodiment are implemented by various processors. Details of the functions of the call control unit 410 according to the present embodiment will be separately described.

(Schedule Management Unit 420)

The schedule management unit 420 according to the present embodiment manages and controls a schedule related to a video call between the performer terminal 20 and the participant terminal 10.

The functions of the schedule management unit 420 according to the present embodiment are implemented by various processors. Details of the functions of the schedule management unit 420 according to the present embodiment will be separately described.

(Purchase Management Unit 430)

The purchase management unit 430 according to the present embodiment manages and controls purchase of various virtual items and the like by a participant.

The functions of the purchase management unit 430 according to the present embodiment are implemented by various processors. Details of the function of the purchase management unit 430 according to the present embodiment and the virtual items described above will be separately described.

(Content Management Unit 440)

The content management unit 440 according to the present embodiment manages and controls content that can be used by a participant waiting for the start of a video call.

The functions of the content management unit 440 according to the present embodiment are implemented by various processors. An example of content managed by the content management unit 440 according to the present embodiment will be separately described.

(Storage Unit 450)

The storage unit 450 according to the present embodiment stores various types of information used for the server 40. For example, the storage unit 450 stores a program used by each of the configurations described above. Furthermore, for example, the storage unit 450 stores information regarding a schedule managed by the schedule management unit 420, an item managed by the purchase management unit 430, content managed by the content management unit 440, and the like.

Furthermore, the storage unit 450 stores information regarding the participant. Examples of the information include, for example, information regarding a right of a video call, information regarding the participant himself/herself input by the participant terminal 10, and information regarding the participant input by the performer terminal 20 or the observer terminal 30.

(Communication Unit 460)

The communication unit 460 according to the present embodiment performs information communication between the participant terminal 10, the performer terminal 20, and the observer terminal 30 via the network 50.

The functional configuration example of the server 40 according to the present embodiment has been described above. Note that the functional configuration described above with reference to FIG. 4 is merely an example, and the functional configuration example of the server 40 according to the present embodiment is not limited to such an example. The functional configuration of the server 40 according to the present embodiment can be flexibly modified according to specifications and operations.

<<1.5. Details of Control>>

Next, control by the server 40 according to the present embodiment will be described in detail. In the above description, it has been described that the call control unit 410 included in the server 40 according to the present embodiment forcibly terminates the video call between the participant terminal 10 and the performer terminal 20 on the basis of the stop request received from the performer terminal 20 or the observer terminal 30.

Hereinafter, other call control functions of the call control unit 410 according to the present embodiment will be described in detail.

For scheduling a video call according to the present embodiment, several methods are assumed. For example, the video call according to the present embodiment may be scheduled after the start time and the end time are clearly adjusted for each fan.

In this case, the schedule management unit 420 according to the present embodiment may present free times during which the artist can deal with the video call to the fan via the participant terminal 10, and schedule the video call in the time zone specified by the fan using the participant terminal 10.

Meanwhile, the video call according to the present embodiment may be scheduled in the queue method on the basis of the order of requests transmitted from the participant terminals 10.

In this case, the schedule management unit 420 according to the present embodiment may present the start time and the end time of the entire interaction event to the fans via the participant terminals 10, and may cause the fans to sequentially wait on the basis of the participation requests transmitted by the fans using the participant terminals 10.

Furthermore, in this case, the call control unit 410 according to the present embodiment may perform monitoring control regarding at least one or more waiting participants (waiting fans) who wait for the start of a video call.

For example, the call control unit 410 according to the present embodiment may cause at least one of the performer terminal 20 or the observer terminal to display a video of the waiting fan captured by the participant terminal 10.

Figure 5:
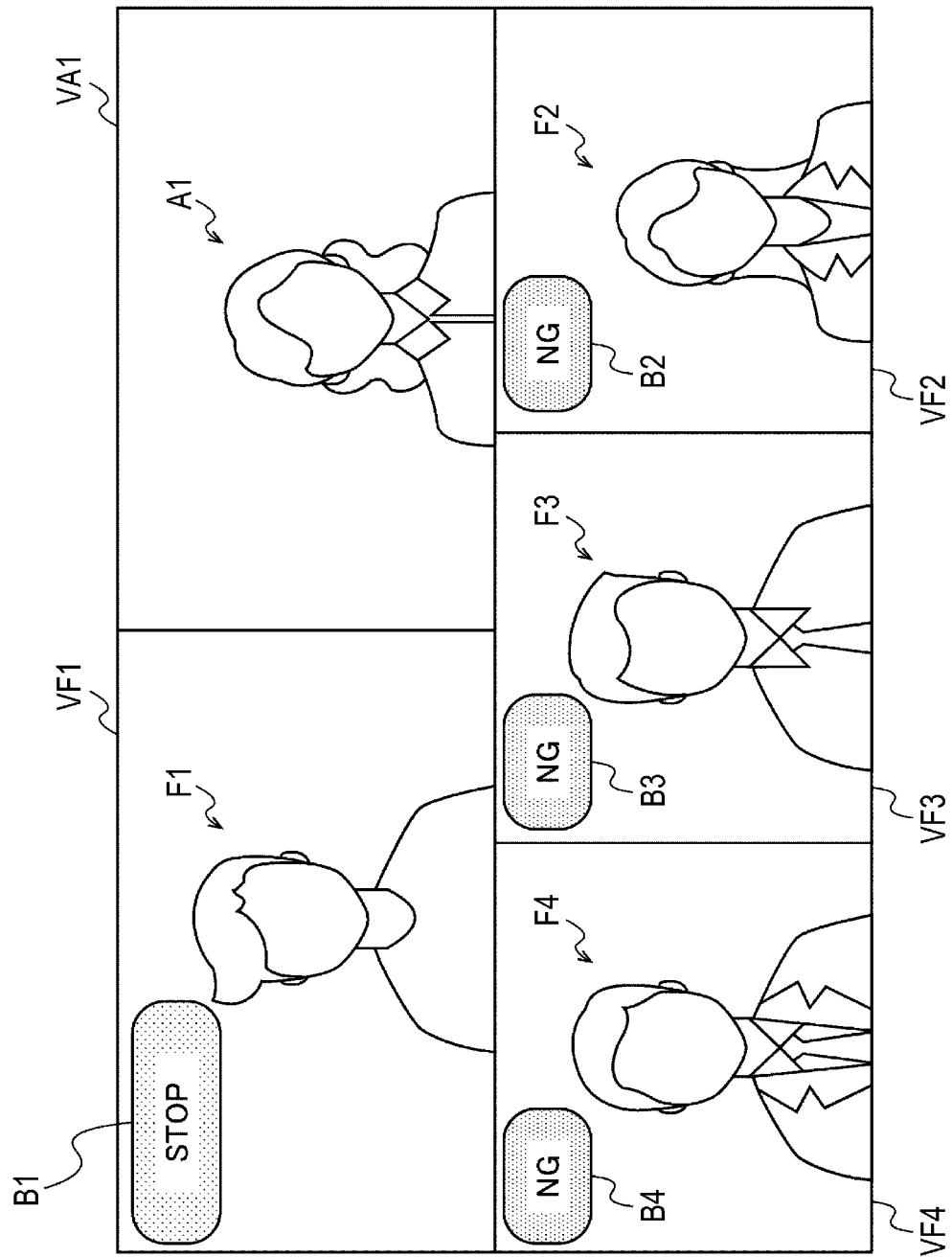
FIG. 5 is a diagram for describing an example of monitoring control of waiting fans by a call control unit 410 according to the embodiment.

FIG. 5 is a diagram for describing an example of monitoring control of waiting fans by the call control unit 410 according to the present embodiment. FIG. 5 illustrates an example of a screen displayed on the performer terminal 20 or the observer terminal 30 by the call control unit 410.

In the case of the example illustrated in FIG. 5, the call control unit 410 displays a fan video VF1 captured by the participant terminal 10 used by the fan F1 and an artist video AF1 captured by the performer terminal 20 used by the artist A1 on the upper part of the screen.

At this time, the call control unit 410 may display the button B1 for transmitting the stop request related to the video call in association with the fan video VF1 (for example, in a superimposed manner).

Furthermore, in the case of the example illustrated in FIG. 5, the call control unit 410 displays videos of waiting fans on the lower part of the screen during the execution of the video call between the fan F1 and the artist A1.

For example, the fan video VF2 may be a video captured by the participant terminal 10 used by the waiting fan F2. Similarly, the fan videos VF3 and VF4 may be videos captured by the participant terminals 10 used by the waiting fans F3 and F4, respectively.

As described above, the call control unit 410 causes the performer terminal 20 or the observer terminal 30 to display the videos of the waiting fans, so that the artist or the observer can visually recognize whether the waiting fans behave disturbingly.

Furthermore, the call control unit 410 according to the present embodiment may forcibly release the waiting state of the corresponding waiting fan on the basis of the exclusion request received from the performer terminal 20 or the observer terminal 30 that displays the video of the waiting fan captured by the participant terminal 10.

For this purpose, the call control unit 410 according to the present embodiment may further display a visual object for transmitting the exclusion request described above on the performer terminal 20 or the observer terminal 30 that displays the videos of the waiting fans.

Examples of the visual object described above include various buttons and icons, for example.

In the case of the example illustrated in FIG. 5, the call control unit 410 displays buttons B2 to B4 for transmitting the exclusion request in association with the fan videos VF2 to VF4, respectively.

According to the control as described above, for example, in a case where the waiting fan F3 behaves inappropriately, the artist A1 or the observer who has visually recognized the behavior operates the button B3, so that the waiting fan F3 can be excluded from the queue related to the call waiting.

Furthermore, in this case, the call control unit 410 causes the performer terminal 20 or the observer terminal 30 to stop displaying the fan video VF3 related to the waiting fan F3.

As described above, according to the call control unit 410 according to the present embodiment, it is possible to protect the artist from inappropriate behavior by the waiting fan in addition to the fan during the call.

Note that, examples of the inappropriate behavior described above include excessive exposure, capturing an image of an article against public order and morality, and the like, for example.

Furthermore, the call control unit 410 according to the present embodiment may further have a function of protecting the artist from the visually inappropriate behavior as described above.

For example, the call control unit 410 according to the present embodiment may cause the performer terminal 20 (and the observer terminal 30) to display a video obtained by processing at least a part of the video of the fan captured by the participant terminal 10.

At this time, the call control unit 410 according to the present embodiment may process the video of the fan so that at least a part of the body of the fan is shielded.

For example, the call control unit 410 may process the video of the fan so that the area where the skin is exposed in the body portion of the fan is shielded. The call control unit 410 can perform processing as described above by using a discriminator that has performed machine learning for discriminating a skin area of the body portion.

Meanwhile, the call control unit 410 according to the present embodiment may process the video of the fan so that the area other than the face of the fan is shielded. The call control unit 410 can perform the processing described above by using a discriminator that has performed machine learning for discriminating a face area.

Furthermore, in the case of performing the processing as described above, the call control unit 410 according to the present embodiment may shield a predetermined area by performing processing of superimposing various visual objects on the fan video.

The visual object described above includes an image (hereinafter, referred to as a virtual item) imitating various articles.

Figure 6:
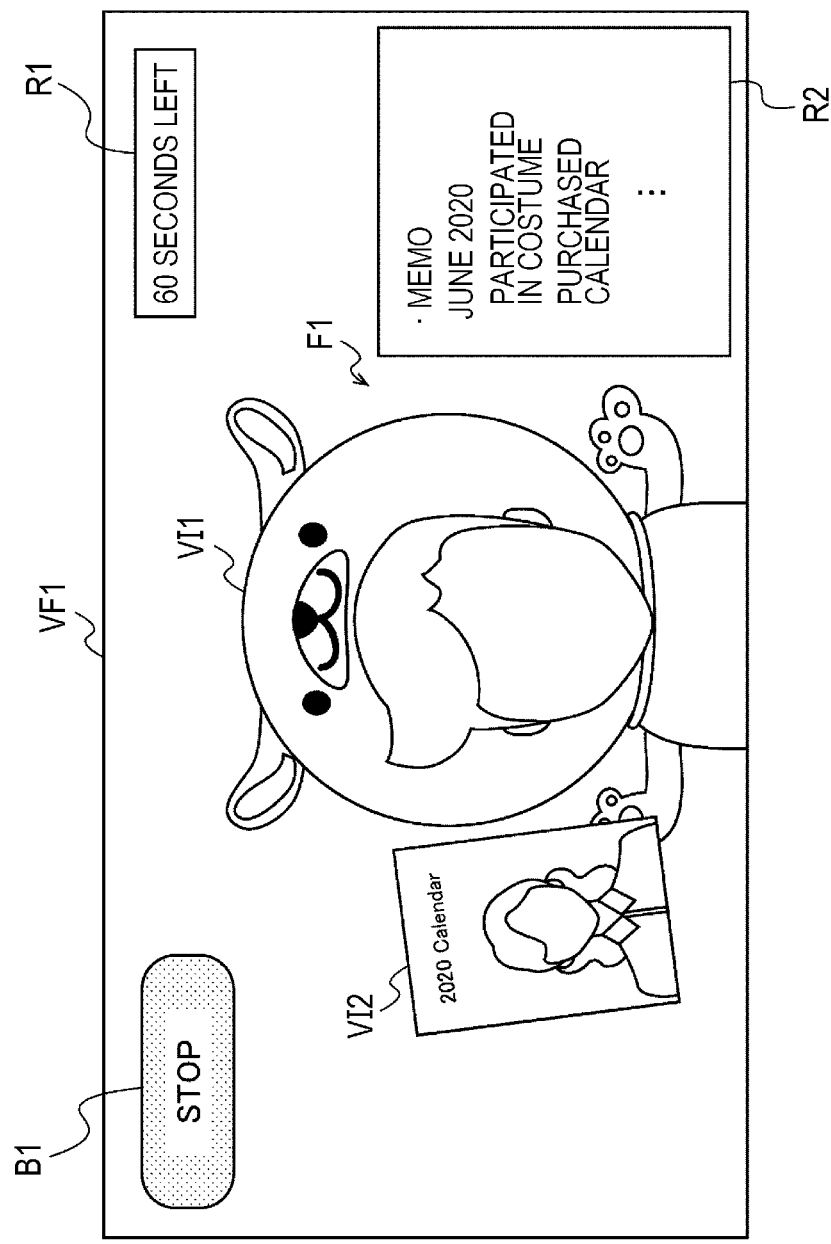
FIG. 6 is a diagram for describing processing of a fan video using virtual items according to the embodiment.

FIG. 6 is a diagram for describing processing of a fan video using virtual items according to the present embodiment.

In the case of the example illustrated in FIG. 6, the call control unit 410 displays a virtual item VI1 imitating a costume in a superimposed manner on the fan video VF1 so that an area other than the face of the fan F1 included in the fan video VF1 is shielded.

According to the control as described above, it is possible to effectively reduce the possibility that the artist receives visually inappropriate behavior from the fan F1.

Note that although it has been described above that the virtual item according to the present embodiment is used to protect an artist, the use of the virtual item according to the present embodiment is not limited to the protection of an artist.

The virtual item according to the present embodiment can also be used by a fan to appeal (impress) to an artist.

In an interaction event in which an unspecified large number of fans participate, an artist interacts with a large number of fans, and thus it may be difficult to memorize features and conversations of all fans.

Therefore, even in an offline interaction event, it is not uncommon for fans to make unique decorations to impress the artist. By such fan efforts, the artist strongly remembers the fan, and the interaction is further activated by topics related to decoration or the like.

Therefore, the call control unit 410 according to the present embodiment may utilize the virtual item as an element that assists the fan's appeal to the artist.

For example, the call control unit 410 according to the present embodiment may process the video of the fan using the virtual item selected by the fan.

In the case of the example illustrated in FIG. 6, the virtual item VI1 may be a visual object purchased and set by the fan F1 before the start of the video call.

According to the control described above by the call control unit 410, it is possible to respond to the fan's desire to impress the artist or entertain the artist.

Furthermore, the virtual gift according to the present embodiment does not function only in a video call, and may work in conjunction with an article in the real world.

For example, in the case of the example illustrated in FIG. 6, the call control unit 410 displays a virtual item VI2 imitating a calendar in a superimposed manner on the fan video VF1.

Here, the virtual item VI2 may be a visual object linked to a calendar as an article in the real world of the artist purchased by the fan F1.

As described above, by setting the virtual item VI2 linked to the article in the real world purchased by the fan F1 so as to be displayed, the fan F1 may report the purchase of the article to the artist and enjoy the topic or the like related to the good.

Furthermore, the artist may perform an operation of handwriting an autograph on the displayed fan video VF1. In this case, a service such as delivery of a calendar in the real world on which the autograph stored by the operation is printed to the fan F1 or the like may be performed.

As described above, the virtual item according to the present embodiment can be used not only for artist protection but also for activating interaction between an artist and a fan and application such as fan service or the like.

Note that the virtual item used for the video call as described above may be automatically recorded and a memo may be left. For example, in the case of the example illustrated in FIG. 6, a memo regarding the virtual items VI1 and VI2 is automatically added to the area R2.

According to the control as described above, in the next video call, the artist can remember the state and conversation content of the video call of the previous time and use the same for interaction with the fan. Note that the memo as described above may be manually input by an artist, an observer, or the like.

Furthermore, the virtual item according to the present embodiment may be used as a gift (hereinafter, referred to as a virtual gift) from a fan to an artist.

Even in offline interaction events, not a few fans offer some sort of gift to an artist.

Therefore, the call control unit 410 according to the present embodiment may cause the participant terminal 10 to display a video obtained by processing at least a part of the video of the artist captured by the performer terminal 20 using the virtual gift (visual object) purchased and selected by the fan.

According to the control as described above, it is possible to respond to the fan's desire to please the artist.

Note that, at this time, the call control unit 410 according to the present embodiment may process the video of the artist using the virtual gift purchased and selected by any fan participating in the interaction event.

Meanwhile, the call control unit 410 according to the present embodiment may process the video of the artist using only the virtual gift purchased and selected by the fan executing the video call.

Figure 7:
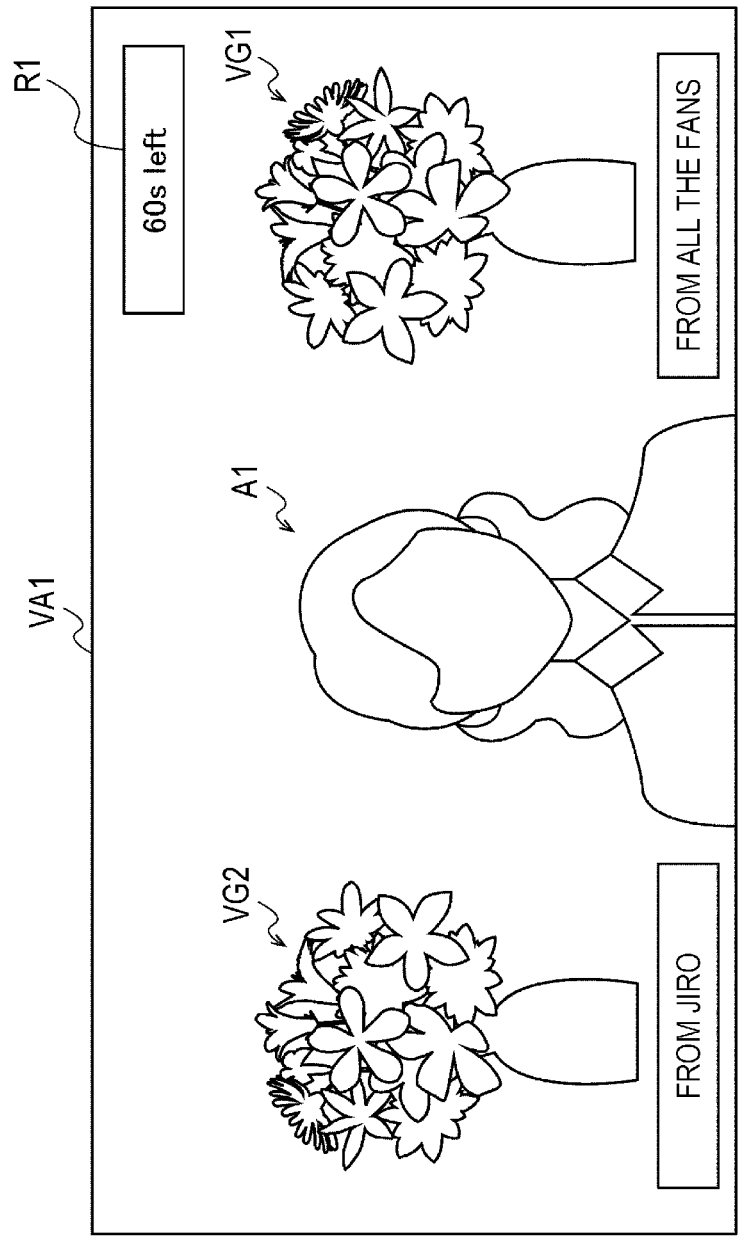
FIG. 7 is a diagram for describing processing of an artist video using virtual gifts according to the embodiment.
Figure 8:
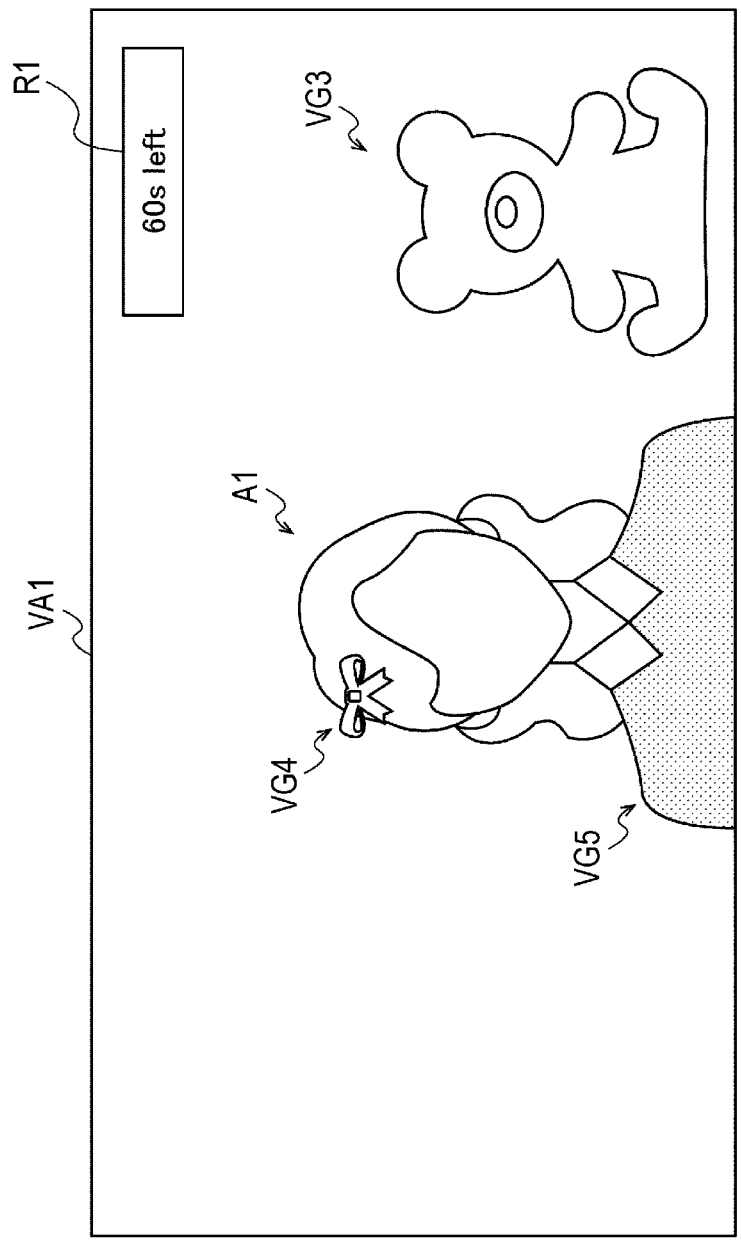
FIG. 8 is a diagram for describing processing of an artist video using virtual gifts according to the embodiment.

FIGS. 7 and 8 are diagrams for describing processing of an artist video using virtual gifts according to the present embodiment.

In the case of the example illustrated in FIG. 7, the call control unit 410 displays virtual gifts VG1 and VG2 in a superimposed manner on the artist video VA1 captured by the performer terminal 20 used by the artist A1.

Here, the virtual gift VG1 may be, for example, a virtual gift sent by the fan F1 executing a video call to the artist A1 in cooperation with other fans.

Furthermore, the virtual gift VG2 may be, for example, a virtual gift sent to the artist A1 by the fan F2 different from the fan F1 executing the video call.

Even in an offline interaction event, there is often an activity based on fan's camaraderie such as decorating an artist's booth with flowers or the like as a whole.

Therefore, the call control unit 410 may simultaneously superimpose the virtual gift purchased and selected by the plurality of fans (including fans before, during, and after starting a video call) participating in the interaction event on the artist video.

According to the control as described above, it is possible to increase the fan's camaraderie and to effectively convey the enthusiasm of the fans to the artist, and an effect of further increasing the fan's and artist's motivation for activities is expected.

Meanwhile, in the case of the example illustrated in FIG. 8, the call control unit 410 displays virtual gifts VG3 to VG5 in a superimposed manner on the artist video VA1 captured by the performer terminal 20 used by the artist A1.

Here, the virtual gifts VG3 to VG5 may be virtual gifts purchased and selected by the fan F1 executing a video call with the artist A1.

According to the display control as described above, the fan executing the video call can have an interaction with the artist A1 surrounded only by the virtual gifts sent by the fan, and it is possible to obtain a special feeling unique to the online interaction event.

Furthermore, the virtual gift VG4 illustrated in FIG. 8 may be an image imitating a ribbon worn on the head, and the virtual gift VG5 may be an image imitating a dress worn by the artist A1 with predetermined music.

As described above, the virtual object according to the present embodiment may include an image related to clothing. Furthermore, in this case, the call control unit 410 according to the present embodiment may process the artist video so that the virtual item related to the clothing described above selected by the fan is superimposed on the artist.

In an offline interaction event, it is currently difficult for an artist to wear dress according to fan's expectations each time. Meanwhile, according to the control as described above, the fan can make a video call with an artist wearing a dress or the like that is a favorite of the fan, and it is possible to further meet the fan's demand and expectations.

The virtual gifts according to the present embodiment have been described above. Note that the virtual gifts purchased and set by the fan may be used in the next and subsequent video calls.

Furthermore, fan services other than those described above will be described here.

For example, the call control unit 410 according to the present embodiment may transmit an image (hereinafter, referred to as a virtual shot) obtained by combining the video of the fan captured by the participant terminal 10 and the video of the artist captured by the performer terminal 20 to the participant terminal 10.

Figure 9:
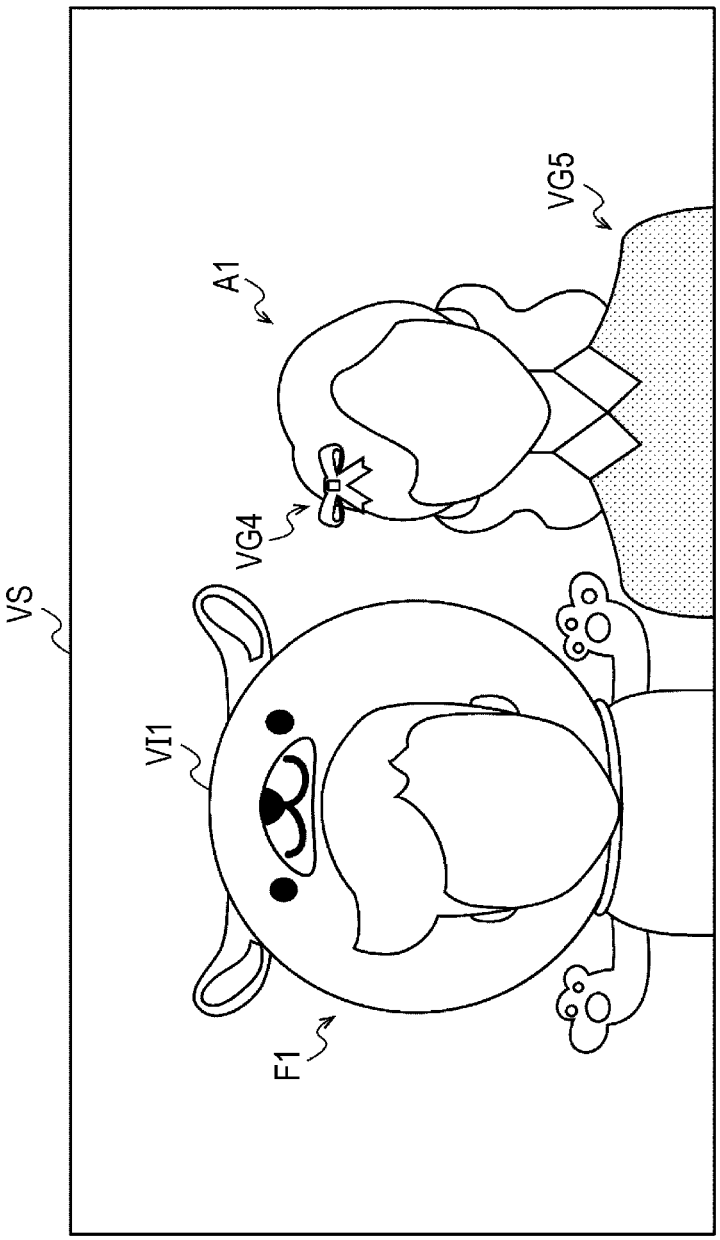
FIG. 9 is a diagram for describing a virtual shot according to the embodiment.

FIG. 9 is a diagram for describing a virtual shot according to the present embodiment. FIG. 9 illustrates an example of the virtual shot VS generated by the call control unit 410 according to the present embodiment after a video call or during a video call and transmitted to the participant terminal 10.

As illustrated, the call control unit 410 according to the present embodiment may generate the virtual shot VS capturing the fan F1 and the artist A1 by combining the images captured by the participant terminal 10 and the performer terminal 20, and transmit the virtual shot VS to the participant terminal 10.

Furthermore, the virtual shot VS may include virtual items used for a video call.

According to the transmission of the virtual shot VS as described above, it is possible to provide the fans with memories of the online interaction event, and an effect of increasing motivation for next participation is expected.

Next, video call control between three or more terminals according to the present embodiment will be described. The case where the call control unit 410 according to the present embodiment controls the video call of 1:1 by the fan and the artist has been described above.

Meanwhile, the call control unit 410 according to the present embodiment may control a video call between at least three or more terminals including a plurality of performer terminals 20 or a plurality of participant terminals 10.

That is, the call control unit 410 according to the present embodiment may control the video call of fan:artist=1:N, fan:artist=N:1, and fan:artist=N:N.

Figure 10:
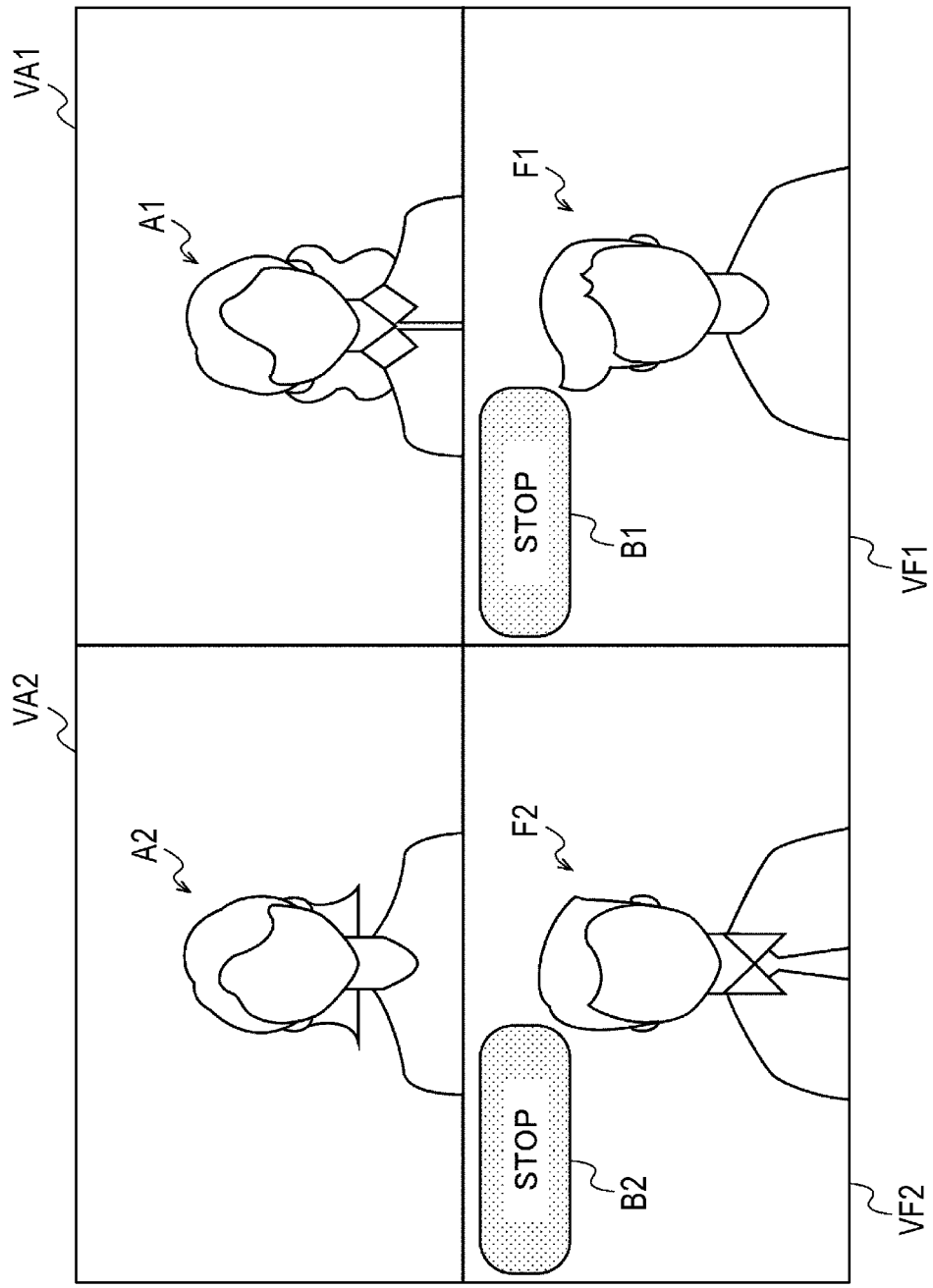
FIG. 10 is a diagram for describing video call control between three or more terminals according to the embodiment.

FIG. 10 is a diagram for describing video call control between three or more terminals according to the present embodiment. In the case of the example illustrated in FIG. 10, the call control unit 410 controls the video call of fan:artist=2:2.

Specifically, the call control unit 410 causes each of the participant terminals 10 and the performer terminals 20 to display the artist videos VA1 and VA2 captured by the performer terminals 20 used by the artists A1 and A2, respectively.

Similarly, the call control unit 410 causes each of the participant terminals 10 and the performer terminals 20 to display the fan videos VF1 and VF2 captured by the participant terminals 10 used by the fans F1 and F2, respectively.

At this time, the call control unit 410 may cause each of the performer terminals 20 to further display buttons B1 and B2 for transmitting a stop request related to each of the fan videos VF1 and VF2.

As illustrated in FIG. 10, the call control unit 410 according to the present embodiment can perform control so that the fan can simultaneously make video calls with a plurality of artists.

Generally, in an offline interaction event, each artist belonging to a group interacts with fans in an independent booth or the like.

Therefore, even in a case where there is a plurality of artists who are favorites in the group, it is difficult for the fan to interact with the plurality of artists at the same time.

Furthermore, it is also assumed that fans support a plurality of artists who is based in different regions from each other. Also in this case, in an offline interaction event, it is difficult for the fan to interact with the plurality of artists described above at the same time from a geographical viewpoint.

Meanwhile, in the online interaction event according to the present embodiment, it is possible to eliminate the restrictions on the booth and the base as described above.

Therefore, by the call control unit 410 performing control as illustrated in FIG. 10, it is possible to simultaneously interact with a plurality of artists supported by the fan, and it is possible to provide the fan with the load value unique to online.

Furthermore, as illustrated in FIG. 10, the call control unit 410 according to the present embodiment can perform control so that a plurality of fans can simultaneously make video calls with an artist.

According to the control as described above, it is possible to respond to a fan's desire such as wanting to support an artist together with friends, feeling a little embarrassed alone but wanting to participate with friends, and the like.

The control related to the video call according to the present embodiment has been described in detail above. Next, control before the start or after the end of the video call according to the present embodiment will be described.

Figure 11:
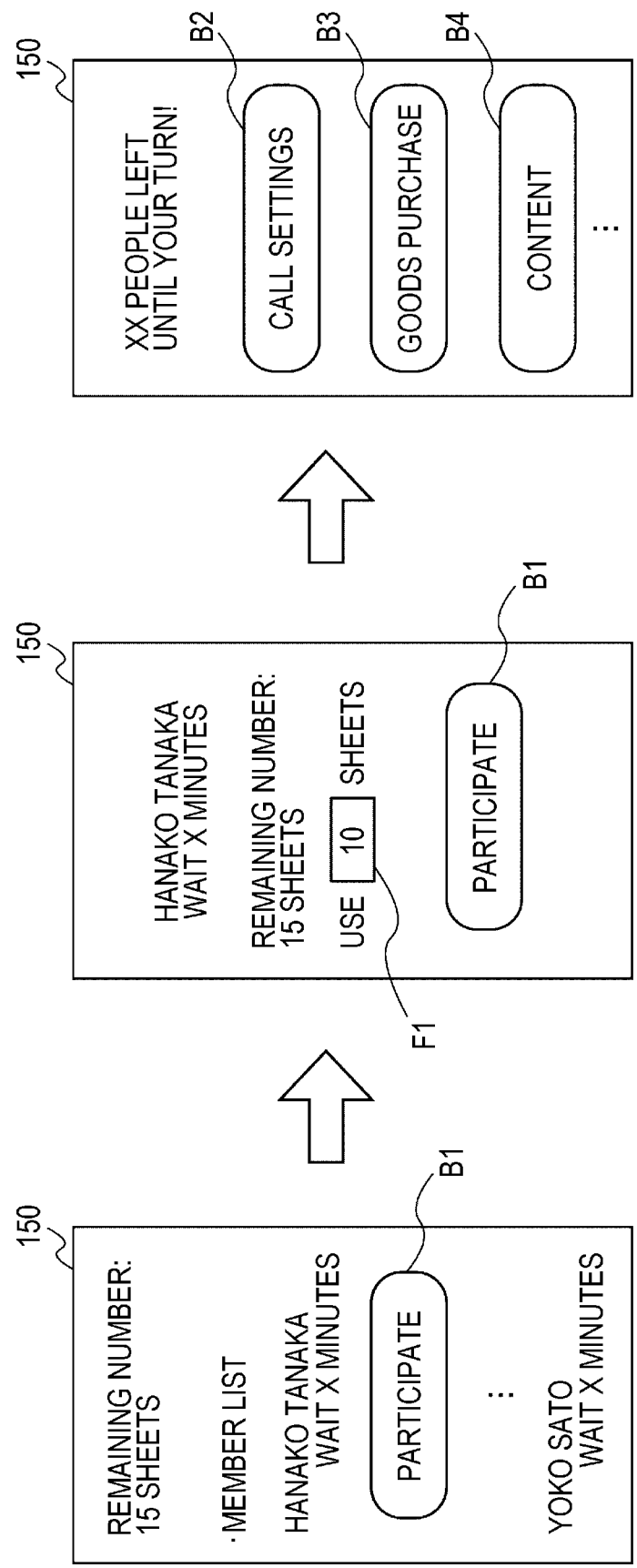
FIG. 11 is a diagram for describing various types of control before starting a video call according to the embodiment.
Figure 12:
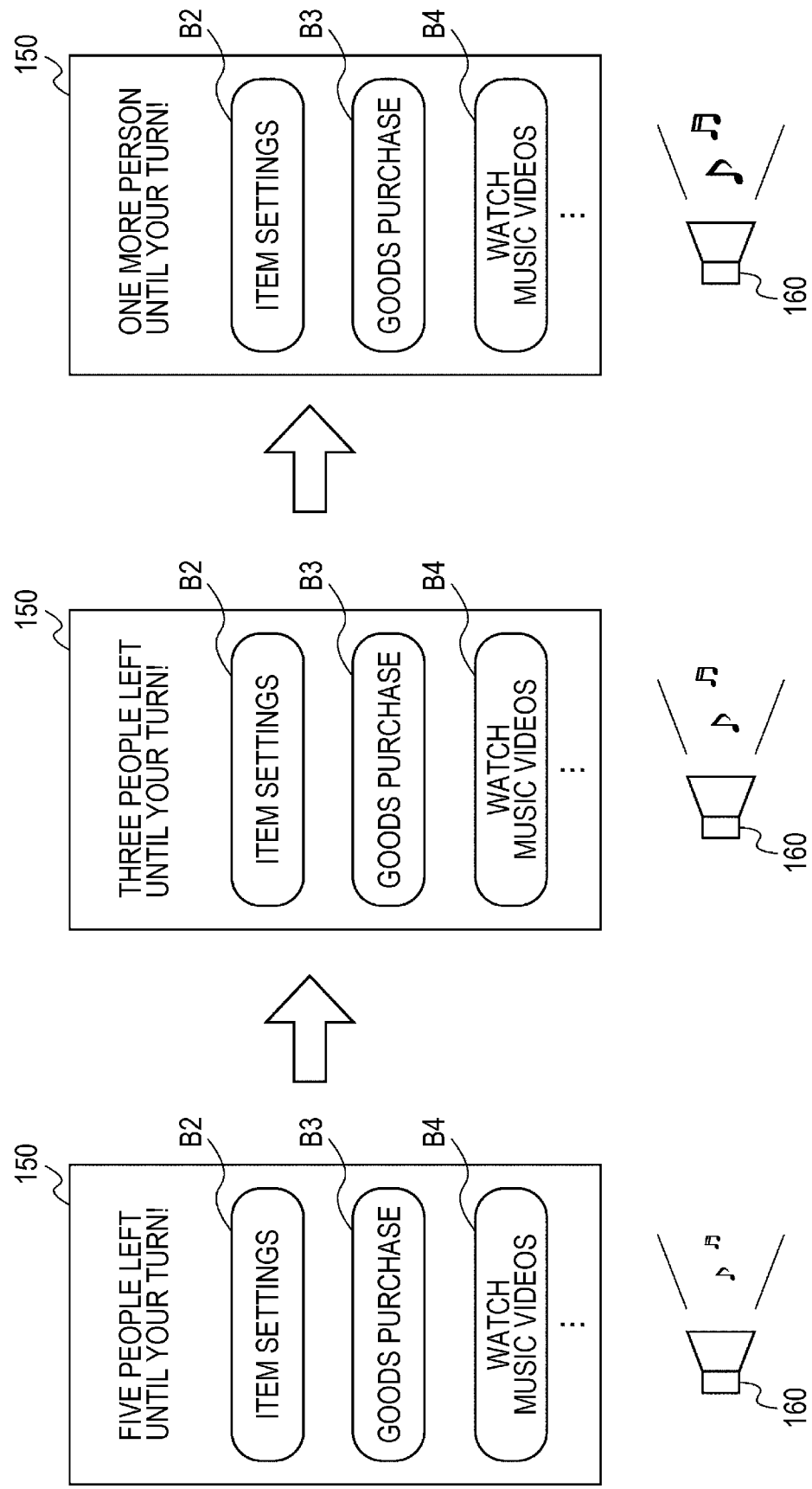
FIG. 12 is a diagram for describing various types of control before starting a video call according to the embodiment.

FIGS. 11 and 12 are diagrams for describing various types of control before starting a video call according to the present embodiment. FIGS. 11 and 12 illustrate an example of screen transition of an application displayed on a display unit 150 included in the participant terminal 10. Note that FIGS. 11 and 12 illustrate an example of a case where the schedule of the video call according to the present embodiment is performed by the above-described queue method.

The fan wishing to participate in the interaction event according to the present embodiment first makes a participation request to the video call using the participant terminal 10.

For example, on the left side of FIG. 11, a screen for the fan to select an artist with whom the fan desires a video call is illustrated. On the screen, for example, a list of artists (members) who can make video calls in the interaction event may be displayed. The user may be able to make the participation request by operating the button B1 corresponding to the artist with whom the user desires the video call. Furthermore, the screen may display information regarding the estimated waiting time of each artist and the right to participate in the video call owned by the fan.

The right to participate in the video call may be attached to, for example, music content or video content purchased by the fan. For example, one serial number is given to the fan who has downloaded and purchased a music content. In this case, the fan may be able to make a video call with the artist for a predetermined time set for one serial number.

In the center of FIG. 11, a screen for inputting how much right to participate is consumed for the video call with the artist selected by the fan is illustrated. For example, the fan inputs how many serial numbers are consumed in the field F1 on the screen, and presses the button B1 again.

At this time, the schedule management unit 420 schedules the video call for a time corresponding to the number of serial numbers input in the field F1, and adds the video call to the queue.

Furthermore, when the schedule is confirmed, a waiting screen as illustrated on the right side of FIG. 11 is displayed on the display unit 150. The waiting screen may display the number of other fans waiting for the start of a video call, the estimated time until the start of the video call, and the like.

Furthermore, links to various functions that can be used by the fan using the time until the start of the video call may be displayed on the waiting screen.

For example, the button B2 may be a link to a function in which the fan performs various settings related to the video call. The function is controlled by the call control unit 410.

For example, the fan can input information such as a nickname that the fan wants the artist to call the fam in the video call, an age, a hometown, a residential area, and the like on the screen transitioned after pressing the button B2. Furthermore, for example, the fan may be able to select virtual items (including virtual gifts) to be used for a video call on a screen that transitions after pressing the button B2.

Note that the input of various types of information and the selection of the virtual items as described above may be performed in a conversational manner using an image, a video, a voice, or the like of an artist.

Furthermore, the button B3 may be a link to a function of purchasing a virtual item or various articles available in the real world. The function is controlled by the purchase management unit 430. The fan may be able to purchase a virtual item or various articles on the screen that transitions after pressing the button B3.

Furthermore, the button B4 may be a link to a function for the waiting fan to use various contents. The function is controlled by the content management unit 440.

Examples of the contents controlled by the content management unit 440 include, for example, video content such as a music video or the like, a quiz about the artist, a chat between fans, and the like. By using the contents as described above during waiting, the fan can get even more excited until the video call is started.

Furthermore, in order to make the waiting fan more excited, the call control unit 410 according to the present embodiment may perform control to cause the participant terminal 10 to output a voice with a volume corresponding to the waiting time until the start of the video call.

For example, in the case of the example illustrated in FIG. 12, the call control unit 410 performs control such that the volume of the voice to be output by a voice output unit 160 included in the participant terminal 10 increases as the number of other waiting fans decreases (the waiting time decreases) from the left to the center to the right in the figure.

The voice described above may be, for example, a voice of a video call currently being made. That is, the call control unit 410 may perform an effect such that the conversation between the artist and another fan is leaked out as the turn of the corresponding fan approaches.

According to the control as described above, it is possible to cause the fan to intuitively perceive that the turn of the fan is gradually approaching, and an effect of giving the fan tension and excitement similar to an online interaction event is expected.

Furthermore, after ending the video call, the call control unit 410 may perform control such that the voice of the conversation between the artist and another fan gradually decreases. According to such control, it is possible to make the fan strongly feel the afterglow after the end of the video call.

Note that the voice used for the control as described above is not necessarily a voice related to the video call being executed. The voice used for the control as described above may be, for example, a voice in which the artist is talking with someone, a singing voice of the artist, or the like.

Meanwhile, the call control unit may allow a plurality of waiting fans to browse the video and voice of the video call without adjusting the volume. In this case, since the video call is grasped by other fans, an effect of suppressing inappropriate behavior is expected.

<<1.6. Flow of Processing>>

Next, a flow of processing by the system 1 according to the present embodiment will be described in detail. First, a flow of processing in a case where the schedule of the video call according to the present embodiment is clearly adjusted for each fan will be described.

Figure 13:
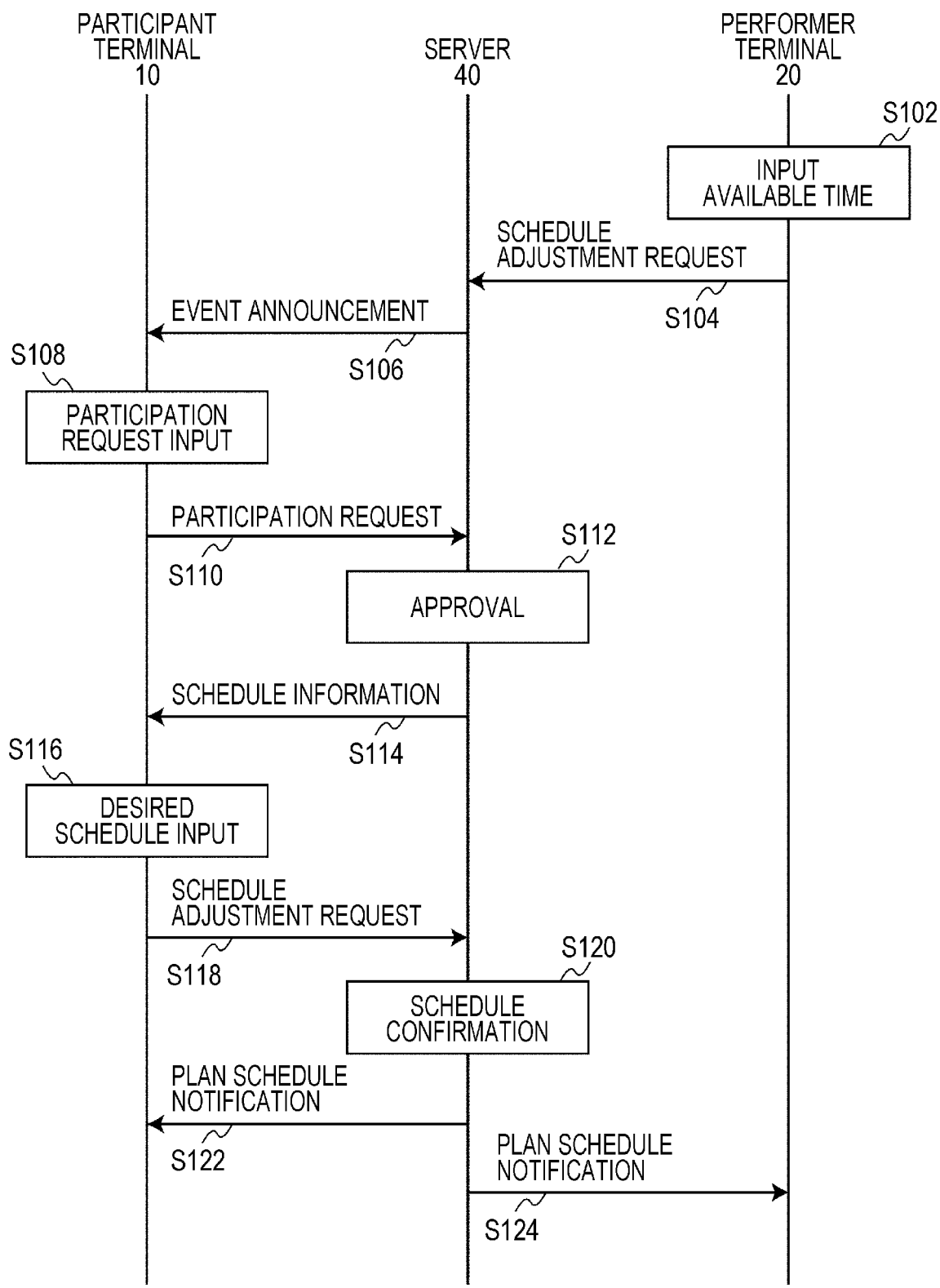
FIG. 13 is a sequence diagram illustrating a flow of processing in a case where a schedule of a video call is clearly adjusted according to the embodiment.

FIG. 13 is a sequence diagram illustrating a flow of processing in a case where the schedule of the video call is clearly adjusted according to the present embodiment.

In this case, as illustrated, first, the artist inputs the available time of the video call using the performer terminal 20 (S102).

Next, the performer terminal 20 transmits a schedule adjustment request to the server 40 on the basis of the available time input in step S102 (S104).

Note that the input of the available time in step S102 and the transmission of the schedule adjustment request in step S104 may be performed by the observer terminal 30.

Next, the schedule management unit 420 included in the server 40 that has received the schedule adjustment request in step S104 controls the communication unit 460 so that an event announcement is transmitted to the plurality of participant terminals 10 on the basis of the schedule adjustment request (S106).

The event announcement described above includes information regarding the event time zone corresponding to the available time input in step S102 and artists who are available for video calls.

Next, the fan who has confirmed the event announcement transmitted in step S106 inputs a participation request using the participant terminal 10 (S108).

Furthermore, the participant terminal 10 transmits a participation request to the server 40 (S110).

The participation request described above includes information regarding the fan using the participant terminal 10, the artist desired as a partner of the video call, and the serial number to be used.

Next, the schedule management unit 420 of the server 40 approves the fan on the basis of the participation request received in step S110 (S112).

Here, in a case where the approval is established, the schedule management unit 420 controls the communication unit 460 so that the schedule information is transmitted to the participant terminal 10 owned by the approved fan (S114).

The schedule information described above includes, for example, information regarding the time zone in which the reservation is already filled by other fans in addition to the event time zone.

Next, the fan confirming the schedule transmitted in step S114 inputs the desired schedule using the participant terminal 10 (S116).

Furthermore, the participant terminal 10 transmits a schedule adjustment request to the server 40 on the basis of the desired schedule input in step S115 (S118).

Next, the schedule management unit 420 of the server 40 performs schedule confirmation on the basis of the schedule adjustment request received in step S118 (S120).

Note that, in a case where the desired time zone included in the schedule adjustment request received in step S118 is already full, the schedule management unit 420 may transmit a request for re-adjustment to the participant terminal 10.

Meanwhile, in a case where the schedule is normally confirmed in step S120, the schedule management unit 420 controls the communication unit 460 so that a plan schedule notification related to the confirmed schedule is transmitted to the participant terminal 10 (S122).

Furthermore, the schedule management unit 420 controls the communication unit 460 so that a plan schedule notification is transmitted to the performer terminal 20 (S122).

Note that the plan schedule notification may also be transmitted to the observer terminal 30.

Figure 14:
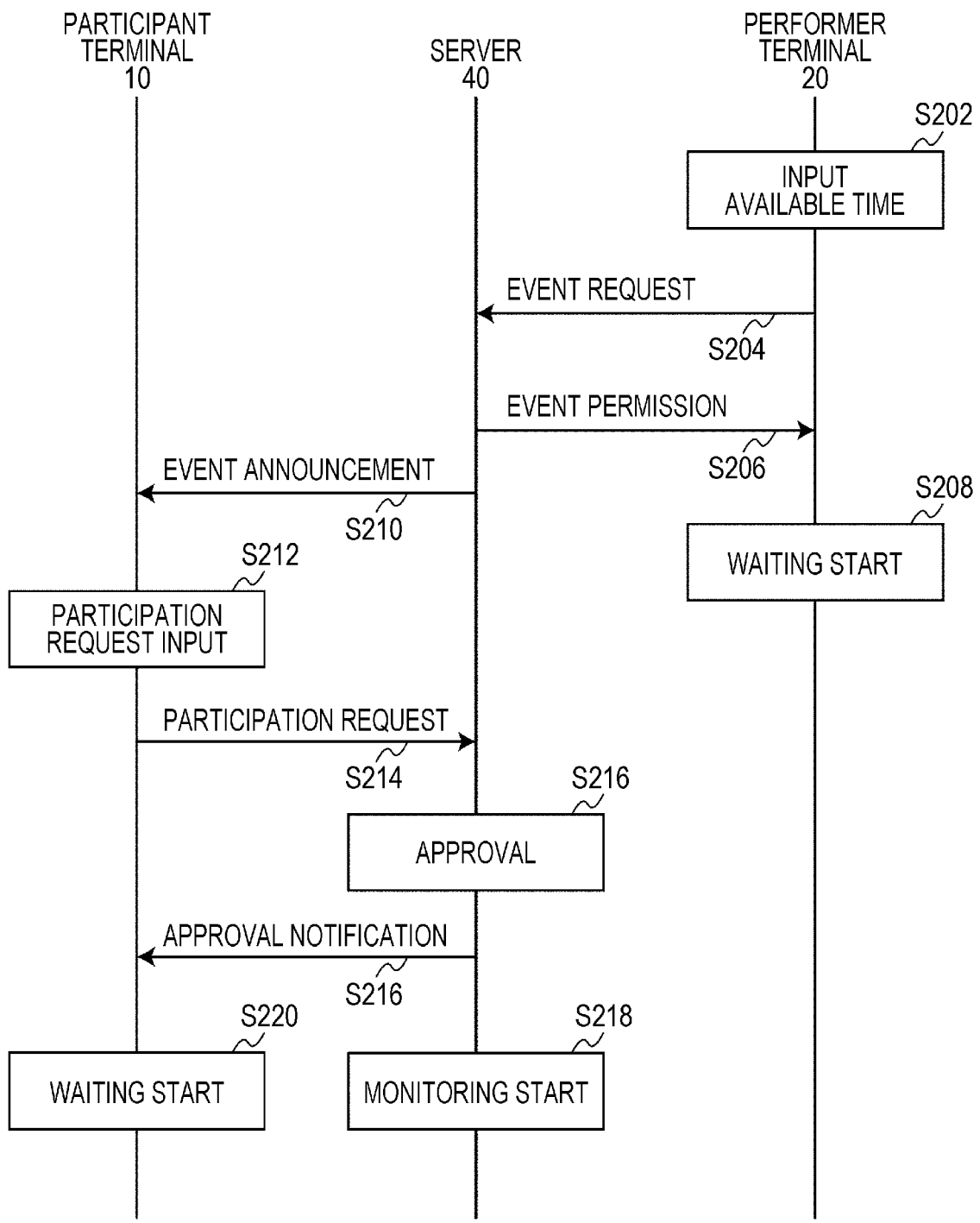
FIG. 14 is a sequence diagram illustrating a flow of processing in a case where a schedule of a video call is performed by a queue method according to the embodiment.

Next, a flow of processing in a case where the schedule of the video call according to the present embodiment is performed by the above-described queue method will be described. FIG. 14 is a sequence diagram illustrating a flow of processing in a case where the schedule of the video call is performed by the queue method according to the present embodiment.

In this case, as illustrated, first, the artist inputs the available time of the video call using the performer terminal 20 (S202).

Next, the performer terminal 20 transmits an event request to the server 40 on the basis of the available time input in step S202 (S204).

Note that the input of the available time in step S202 and the transmission of the event request in step S204 may be performed by the observer terminal 30.

Next, the schedule management unit 420 included in the server 40 that has received the event request in step S204 controls the communication unit 460 so that the event permission based on the event request is transmitted to the performer terminal 20 (S206).

The performer terminal 20 that has received the event permission in step S206 starts waiting (S208).

Furthermore, the schedule management unit 420 included in the server 40 controls the communication unit 460 so that the event announcement is transmitted to the plurality of participant terminals 10 (S210).

The event announcement described above includes the event time zone corresponding to the available time input in step S202, information regarding artists who are available for video calls, and information regarding the current state of the queue. The information includes the number of fans waiting at present, an estimated waiting time in a case where a participation request is made, and the like. Furthermore, the information may be updated each time and provided to the participant terminal 10.

Next, the fan who has confirmed the event announcement transmitted in step S210 inputs a participation request using the participant terminal 10 (S212).

Furthermore, the participant terminal 10 transmits a participation request to the server 40 (S214).

The participation request described above includes information regarding the fan using the participant terminal 10, the artist desired as a partner of the video call, and the serial number to be used.

Next, the schedule management unit 420 of the server 40 approves the fan on the basis of the participation request received in step S214 (S216).

Here, in a case where the approval is established, the schedule management unit 420 controls the communication unit 460 so that an approval notification is transmitted to the participant terminal 10 owned by the approved fan (S216).

The approval notification described above may include information indicating that the participation request is approved and information indicating that monitoring during waiting is performed.

Next, the schedule management unit 420 of the server 40 starts monitoring the participant terminal 10 to which the approval notification has been transmitted in step S216 (S218).

Furthermore, the participant terminal 10 that has received the approval notification in step S216 starts waiting (S220).

Figure 15:
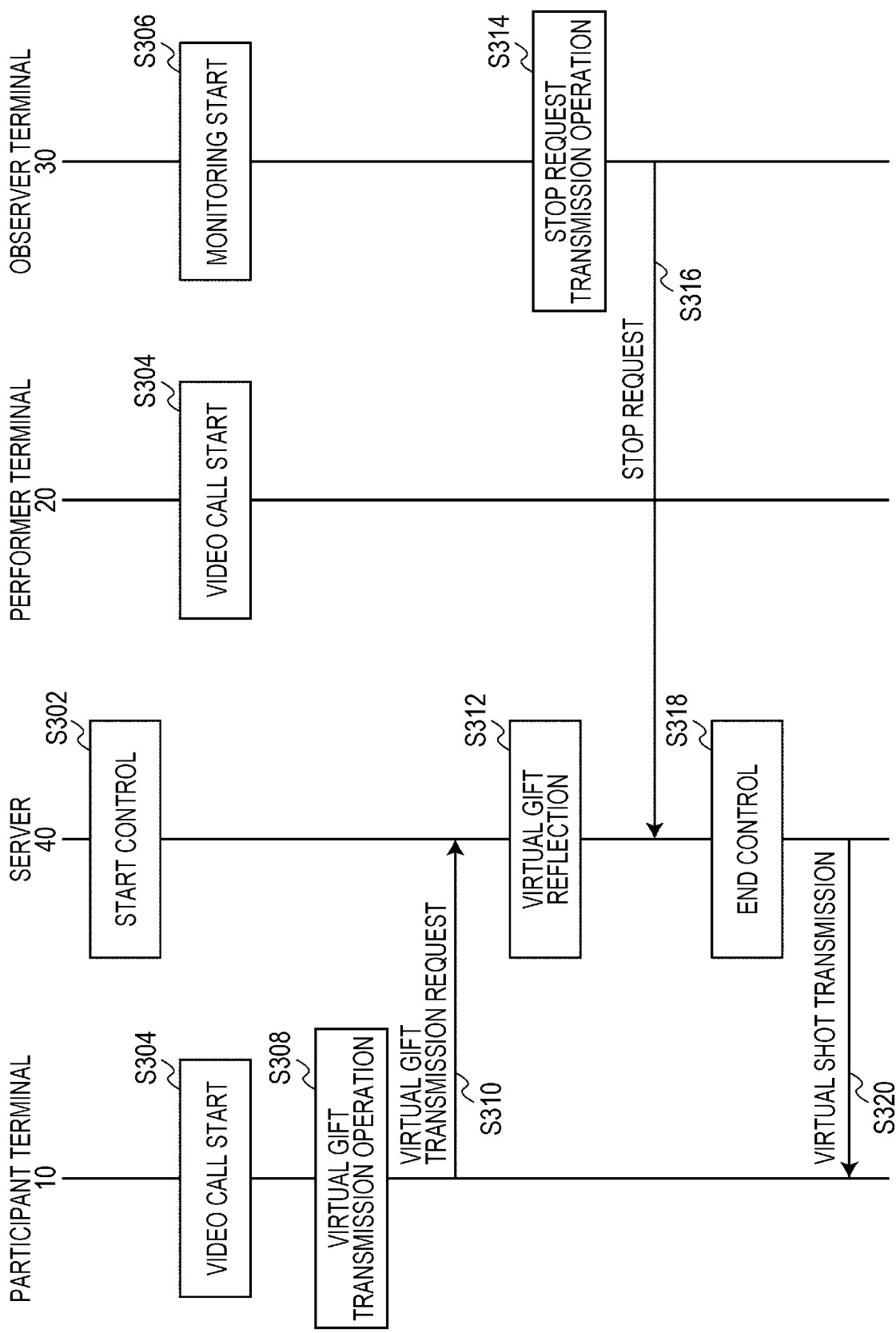
FIG. 15 is a sequence diagram illustrating a flow of processing in a video call according to the embodiment.

Next, a flow of processing in the video call according to the present embodiment will be described. FIG. 15 is a sequence diagram illustrating a flow of processing in the video call according to the present embodiment.

First, the call control unit 410 included in the server 40 performs start control of a video call between the target participant terminal 10 and the performer terminal 20 (S302).

Furthermore, the communication unit 460 transmits a control signal generated in accordance with the start control in step S302 to the participant terminal 10, the performer terminal 20, and the observer terminal 30 (illustration is omitted).

Next, a video call is started between the participant terminal 10 and the performer terminal 20 that have received the control signal generated in accordance with the start control in step S302 (S304).

Furthermore, the observer terminal 30 that has received the control signal generated in accordance with the start control in step S302 starts monitoring the video call between the participant terminal 10 and the performer terminal 20 (S306).

After the video call is started in step S304, the fan performs a virtual gift transmission operation using the participant terminal 10 as necessary (S308).

In a case where the virtual gift transmission operation is performed in step S308, a virtual gift transmission request is transmitted to the server 40 (S310).

The call control unit 410 of the server 40 that has received the virtual gift transmission request in step S310 performs control to reflect the virtual gift (S312).

Note that the processing in steps S308 to S312 is not necessarily performed, but is repeatedly executed as necessary.

Furthermore, after the monitoring of the video call is started in step S306, the observer performs a stop request transmission operation using the observer terminal 30 as necessary (S314).

In a case where the stop request transmission operation is performed in step S314, the observer terminal 30 transmits a stop request to the server 40 (S316).

Note that the processing in steps S314 and S316 is not necessarily performed. Furthermore, the communication request transmission operation and the transmission of the stop request may be executed by the performer terminal 20.

In a case where the communication unit 460 receives the stop request in step S316 or in a case where it is the end time of the video call, the call control unit 410 performs end control of the video call between the participant terminal 10 and the performer terminal 20 (S318).

Furthermore, the communication unit 460 transmits a control signal generated in accordance with the end control in step S318 to the participant terminal 10, the performer terminal 20, and the observer terminal 30 (illustration is omitted).

Next, the call control unit 410 generates a virtual shot and controls the communication unit 460 so that the virtual shot is transmitted to the participant terminal 10 (S320).

Note that the generation and transmission of the virtual shot in step S320 may be based on a request from the participant terminal 10. Furthermore, the generation and transmission of the virtual shot may be charged.

2. Hardware Configuration Example

Figure 16:
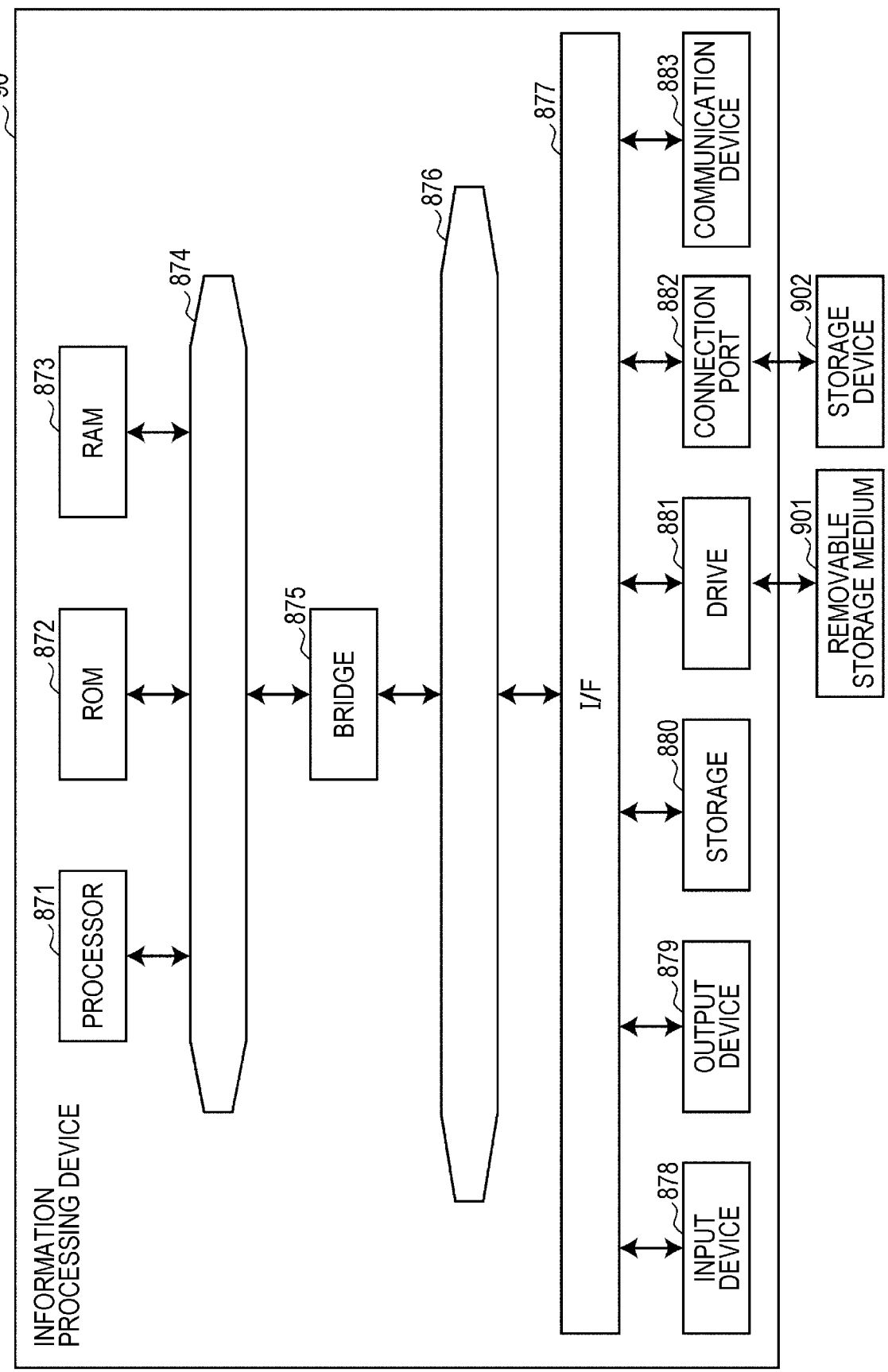
FIG. 16 is a block diagram illustrating a hardware configuration example of an information processing device 90 according to the embodiment.

Next, a hardware configuration example common to the participant terminal 10, the performer terminal 20, the observer terminal 30, and the server 40 according to an embodiment of the present disclosure will be described. FIG. 16 is a block diagram illustrating a hardware configuration example of an information processing device 90 according to an embodiment of the present disclosure. The information processing device 90 may be a device having a hardware configuration equivalent to that of each of the devices described above. As illustrated in FIG. 16, the information processing device 90 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Furthermore, components other than the components illustrated here may be further included.

(Processor 871)

The processor 871 functions as, for example, an arithmetic processing device or a control device, and controls the overall operation of each component or a part thereof on the basis of various programs recorded in the ROM 872, the RAM 873, the storage 880, or a removable storage medium 901.

(ROM 872, RAM 873)

The ROM 872 is a means that stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, Interface 877)

The processor 871, the ROM 872, and the RAM 873 are mutually connected via, for example, the host bus 874 capable of high-speed data transmission. Meanwhile, the host bus 874 is connected to the external bus 876 having a relatively low data transmission speed via the bridge 875, for example. Furthermore, the external bus 876 is connected to various components via the interface 877.

(Input Device 878)

As the input device 878, for example, a mouse, a keyboard, a touch panel, a button, a switch, a lever, and the like are used. Moreover, as the input device 878, a remote controller capable of transmitting a control signal using infrared rays or other radio waves may be used. Furthermore, the input device 878 includes a voice input device such as a microphone or the like.

(Output Device 879)

The output device 879 is, for example, a device capable of visually or audibly notifying the user of acquired information, such as a display device such as a cathode ray tube (CRT), an LCD, an organic EL, or the like, an audio output device such as a speaker, a headphone, or the like, a printer, a mobile phone, a facsimile, or the like. Furthermore, the output device 879 according to the present disclosure includes various vibration devices capable of outputting tactile stimulation.

(Storage 880)

The storage 880 is a device for storing various data. As the storage 880, for example, a magnetic storage device such as a hard disk drive (HDD) or the like, a semiconductor storage device, an optical storage device, a magneto-optical storage device, or the like is used.

(Drive 881)

The drive 881 is, for example, a device that reads information recorded on the removable storage medium 901 such as a magnetic disk, an optical disk, a magneto-optical disk, a semiconductor memory, or the like, or writes information to the removable storage medium 901.

(Removable Storage Medium 901)

The removable storage medium 901 is, for example, a DVD medium, a Blu-ray (registered trademark) medium, an HD DVD medium, various semiconductor storage media, or the like. Of course, the removable storage medium 901 may be, for example, an IC card on which a non-contact IC chip is mounted, an electronic device, or the like.

(Connection Port 882)

The connection port 882 is, for example, a port for connecting an external connection device 902 such as a universal serial bus (USB) port, an IEEE 1394 port, a small computer system interface (SCSI), an RS-232C port, an optical audio terminal, or the like.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

3. Summary

As described above, the server 40 according to an embodiment of the present disclosure includes the call control unit 410 that controls a video call between the performer terminal 20 used by the performer and the participant terminal 10 used by the participant. Furthermore, one of the features of the call control unit 410 according to an embodiment of the present disclosure is that the video call described above is forcibly terminated on the basis of a stop request received from the performer terminal 20 or the observer terminal 30 used by the observer who monitors the video call described above.

According to the configuration described above, it is possible to effectively protect performers in an online interaction event.

Although the preferred embodiment of the present disclosure has been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

For example, in the embodiment described above, the case where the system 1 is used for an interaction event between artists and fans has been described as a main example. However, the application range of the system 1 is not limited to such an example. The system 1 can also be applied to, for example, a webinar between speakers and participants, online education between lecturers and participants, an online meeting between presenters and reporters, and the like. The system 1 can be widely applied to online events between a small number of specific persons and an unspecified large number of participants.

Furthermore, each step related to the processing described in the present specification is not necessarily processed in time series in the order described in the flowchart or the sequence diagram. For example, each step related to the processing of each device may be processed in an order different from the described order or may be processed in parallel.

Furthermore, the series of processing by each device described in the present specification may be implemented using any of software, hardware, and a combination of software and hardware. The program constituting the software is provided inside or outside each device, for example, and is stored in advance in a non-transitory computer readable medium readable by a computer. Then, each program is read into the RAM at the time of execution by the computer, for example, and is executed by various processors. The storage medium described above is, for example, a magnetic disk, an optical disk, a magneto-optical disk, a flash memory, or the like. Furthermore, the computer program described above may be distributed via, for example, a network without using a storage medium.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the following configurations also belong to the technical scope of the present disclosure.

(1) An information processing device including
a call control unit that controls a video call between a performer terminal used by a performer and a participant terminal used by a participant,
in which the call control unit forcibly terminates the video call on the basis of a stop request received from the performer terminal or an observer terminal used by an observer who monitors the video call.

(2) The information processing device according to (1),
in which the call control unit causes the performer terminal and the observer terminal to display a visual object for transmitting the stop request in association with a start of the video call.

(3) The information processing device according to (1) or (2),
in which the call control unit performs monitoring control on at least one or more waiting participants waiting for a start of the video call.

(4) The information processing device according to (3),
in which the call control unit causes at least one of the performer terminal or the observer terminal to display a video of a waiting participant captured by the participant terminal.

(5) The information processing device according to (4),
in which the call control unit forcibly releases a waiting state of the waiting participant corresponding on the basis of an exclusion request received from the performer terminal or the observer end that displays the video of the waiting participant.

(6) The information processing device according to (5),
in which the call control unit further causes the performer terminal or the observer terminal that displays the video of the waiting participant to display a visual object for transmitting the exclusion request.

(7) The information processing device according to any one of (1) to (6),
in which the call control unit causes the performer terminal to display a video obtained by processing at least a part of a video of the participant captured by the participant terminal.

(8) The information processing device according to (6),
in which the call control unit processes a video of the participant so that at least a part of a body of the participant is shielded.

(9) The information processing device according to (7) or (8),
in which the call control unit processes the video of the participant so that an area other than a face of the participant is shielded.

(10) The information processing device according to any one of (7) to (9),
in which the call control unit processes the video of the participant by using a visual object selected by the participant.

(11) The information processing device according to any one of (1) to (10),
in which the call control unit causes the participant terminal to display a video obtained by processing at least a part of a video of the performer captured by the performer terminal.

(12) The information processing device according to (11),
in which the call control unit processes the video of the performer by using a visual object selected by any participant.

(13) The information processing device according to (11),
in which the call control unit processes the video of the performer by using a visual object selected by the participant who is executing the video call.

(14) The information processing device according to (13),
in which the visual object includes an image related to clothing, and
the call control unit processes an image of the performer so that the image related to the clothing selected by the participant is superimposed on the performer.

(15) The information processing device according to any one of (1) to (14),
in which the call control unit transmits, to the participant terminal, an image obtained by combining a video of the participant captured by the participant terminal and a video of the performer captured by the performer terminal.

(16) The information processing device according to any one of (3) to (6),
in which the call control unit causes the participant terminal to output a voice with a volume corresponding to a waiting time until the start of the video call.

(17) The information processing device according to any one of (1) to (16),
in which the call control unit controls the video call between at least three or more terminals including a plurality of the performer terminals or a plurality of the participant terminals.

(18) An information processing method including
controlling, by a processor, a video call between a performer terminal used by a performer and a participant terminal used by a participant,
in which the controlling further includes forcibly terminating the video call on the basis of a stop request received from the performer terminal or an observer terminal used by an observer who monitors the video call.

(19) A program for causing a computer to function as an information processing device including
a call control unit that controls a video call between a performer terminal used by a performer and a participant terminal used by a participant, in which the call control unit forcibly terminates the video call on the basis of a stop request received from the performer terminal or an observer terminal used by an observer who monitors the video call.

(20) A system including:
a performer terminal used by a performer;
a participant terminal used by a participant;
a server that controls a video call between the performer terminal and the participant terminal; and
an observer terminal used by an observer who monitors the video call,
in which the server forcibly terminates the video call on the basis of a stop request received from the performer terminal or the observer terminal.

REFERENCE SIGNS LIST

10 Participant terminal
20 Performer terminal
30 Observer terminal
40 Server
410 Call control unit
420 Schedule management unit
430 Purchase management unit
440 Content management unit
450 Storage unit
460 Communication unit

The invention claimed is:

1. An information processing device, comprising:
a processor configured to:
control a video call between a performer terminal associated with a performer and a participant terminal associated with a participant, wherein
a time duration of the video call is based on a right, to participate in the video call, owned by the participant,
the right to participate in the video call includes at least one serial number associated with purchased music content of the performer,
each serial number of the at least one serial number is associated with a specific time duration for the video call, and
in the control of the video call, the processor is further configured to:
forcibly terminate the video call based on a stop request received from one of the performer terminal or an observer terminal associated with an observer, wherein the video call is monitored by the observer; and
cause the performer terminal and the observer terminal to display a first visual object for transmission of the stop request in association with a start of the video call.

2. The information processing device according to claim 1,
wherein the processor is further configured to perform monitoring control on at least one waiting participant waiting for the start of the video call.

3. The information processing device according to claim 2,
wherein the processor is further configured to cause at least one of the performer terminal or the observer terminal to display a video of a waiting participant captured by the participant terminal.

4. The information processing device according to claim 3,
wherein the processor is further configured to forcibly release a waiting state of the waiting participant based on an exclusion request received from the performer terminal or the observer terminal that displays the video of the waiting participant.

5. The information processing device according to claim 4,
wherein the processor is further configured to cause the performer terminal or the observer terminal that displays the video of the waiting participant to display a second visual object for transmission of the exclusion request.

6. The information processing device according to claim 1,
wherein the processor is further configured to cause the performer terminal to display a video obtained from at least a part of a video of the participant captured by the participant terminal.

7. The information processing device according to claim 5,
wherein the processor is further configured to process a video of the participant so that at least a part of a body of the participant is shielded.

8. The information processing device according to claim 6,
wherein the processor is further configured to process the video of the participant so that an area other than a face of the participant is shielded.

9. The information processing device according to claim 6,
wherein the processor is further configured to process the video of the participant by using a second visual object selected by the participant.

10. The information processing device according to claim 1,
wherein the processor is further configured to cause the participant terminal to display a video obtained from at least a part of a video of the performer captured by the performer terminal.

11. The information processing device according to claim 10,
wherein the processor is further configured to process the video of the performer by using a second visual object selected by the participant.

12. The information processing device according to claim 10,
wherein the processor is further configured to process the video of the performer by using a second visual object selected by the participant of the video call.

13. The information processing device according to claim 12, wherein
the second visual object includes an image related to clothing, and
the processor is further configured to process an image of the performer so that the image related to the clothing selected by the participant is superimposed on the performer.

14. The information processing device according to claim 1,
wherein the processor is further configured to transmit, to the participant terminal, an image obtained by combination of a video of the participant captured by the participant terminal and a video of the performer captured by the performer terminal.

15. The information processing device according to claim 2,
wherein the processor is further configured to cause the participant terminal to output a voice with a volume corresponding to a waiting time until the start of the video call.

16. The information processing device according to claim 1, wherein
a plurality of performer terminals includes the performer terminal,
a plurality of participant terminals includes the participant terminal, and
the processor is further configured to control the video call between at least three terminals including the plurality of performer terminals or the plurality of participant terminals.

17. An information processing method, comprising
controlling, by a processor, a video call between a performer terminal associated with a performer and a participant terminal associated with a participant, wherein
a time duration of the video call is based on a right, to participate in the video call, owned by the participant,
the right to participate in the video call includes at least one serial number associated with purchased music content of the performer,
each serial number of the at least one serial number is associated with a specific time duration for the video call, and
the controlling further includes;
forcibly terminating the video call based on a stop request received from one of the performer terminal or an observer terminal associated with an observer, wherein the video call is monitored by the observer; and
causing the performer terminal and the observer terminal to display a visual object for transmitting the stop request in association with a start of the video call.

18. A non-transitory computer-readable medium having stored thereon, computer executable instructions which, when executed by a computer, cause the computer to execute operations, the operations comprising:
controlling a video call between a performer terminal associated with a performer and a participant terminal associated with a participant, wherein
a time duration of the video call is based on a right, to participate in the video call, owned by the participant,
the right to participate in the video call includes at least one serial number associated with purchased music content of the performer,
each serial number of the at least one serial number is associated with a specific time duration for the video call, and
the controlling the video call further includes:
forcibly terminating the video call based on a stop request received from one of the performer terminal or an observer terminal associated with an observer, wherein the video call is monitored by the observer; and
causing the performer terminal and the observer terminal to display a visual object for transmitting the stop request in association with a start of the video call.

19. A system, comprising:
a performer terminal associated with a performer;
a participant terminal associated with a participant;
a server, having a processor, configured to control a video call between the performer terminal and the participant terminal, wherein
a time duration of the video call is based on a right, to participate in the video call, owned by the participant,
the right to participate in the video call includes at least one serial number associated with purchased music content of the performer, and
each serial number of the at least one serial number is associated with a specific time duration for the video call; and
an observer terminal associated with an observer to monitor the video call,
wherein, in the control of the video call, the processor is further configured to:
forcibly terminate the video call based on a stop request received from one of the performer terminal or the observer terminal; and
cause the performer terminal and the observer terminal to display a visual object for transmission of the stop request in association with a start of the video call.

* * * * *